(12) United States Patent
Huang et al.

(10) Patent No.: US 12,432,339 B2
(45) Date of Patent: Sep. 30, 2025

(54) MERGE CANDIDATE REORDERING IN VIDEO CODING

(71) Applicant: QUALCOMM Incorporated, San Diego, CA (US)

(72) Inventors: Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/804,687

(22) Filed: May 31, 2022

(65) Prior Publication Data

US 2022/0417500 A1    Dec. 29, 2022

Related U.S. Application Data

(60) Provisional application No. 63/216,432, filed on Jun. 29, 2021.

(51) Int. Cl.
*H04N 19/105* (2014.01)
*H04N 19/176* (2014.01)
*H04N 19/503* (2014.01)
*H04N 19/70* (2014.01)

(52) U.S. Cl.
CPC ......... *H04N 19/105* (2014.11); *H04N 19/176* (2014.11); *H04N 19/503* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 10,701,393 B2 | 6/2020 | Chen et al. | |
| 2013/0188715 A1* | 7/2013 | Seregin | H04N 19/52 375/240.16 |
| 2019/0124350 A1* | 4/2019 | Thirumalai | H04N 19/537 |
| 2020/0162743 A1* | 5/2020 | Park | H04N 19/513 |
| 2020/0374513 A1* | 11/2020 | Xiu | H04N 19/625 |
| 2021/0037238 A1* | 2/2021 | Park | H04N 19/105 |
| 2022/0417500 A1* | 12/2022 | Huang | H04N 19/105 |

OTHER PUBLICATIONS

Chang Y-J., et al., "EE2-3.4, EE2-3.5, EE2-3.6: Experimental Results of the MV Candidates Reordering in Candidate Types Based on Template Matching Costs", JVET-Y0134-v3, Joint Video Experts Team (JVET) of ITU-T SG 16 WP 3 and ISO/IEC JTC 1/SC 29 25th Meeting, by teleconference, Jan. 12-21, 2022, pp. 1-6.

(Continued)

*Primary Examiner* — Chikaodili E Anyikire
(74) *Attorney, Agent, or Firm* — Shumaker & Sieffert, P. A.

(57) ABSTRACT

A video coder is configured to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and code a block of video data using the output merge candidate list.

17 Claims, 15 Drawing Sheets

(56) References Cited

OTHER PUBLICATIONS

Chang Y.J., et al., "EE2-Related: MV Candidate Type-Based ARMC", JVET-X0133-v3, Joint Video Experts Team (JVET) of ITU-T SG 16 WP 3 and ISO/IEC JTC 1/SC 29, 24th Meeting, by teleconference, Oct. 6-15, 2021, pp. 1-4.

Chang Y-J., et al., "Compression Efficiency Methods Beyond VVC", 21. JVET Meeting, Oct. 6, 2021-Jan. 15, 2021, by teleconference, (The Joint Video Exploration Team of ISO/IEC JTC1/SC29/WG11 and ITU-T SG.16), No. JVET-U0100, Dec. 31, 2020, 13 Pages, XP030293237.

Chang Y-J., et al., (Qualcomm): "EE2: Tests of Compression Efficiency Methods Beyond VVC", 22. JVET Meeting, Apr. 20, 2021-Apr. 28, 2021, Teleconference, (The Joint Video Exploration Team of ISO/IEC JTC1/SC29/WG11 and ITU-T SG.16 WP 3), No. JVET-V0120-V2, m56535, Apr. 22, 2021, pp. 1-31, XP030294307.

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 29/WG 11, 10th Meeting: San Diego, US, Apr. 10-20, 2018, pp. 1-42.

Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

Hsu C.W., (Mediatek) et al., "CE4-Related: On Merge List Construction", 126. MPEG Meeting, JVET-N0851-v2, Mar. 25, 2019-Mar. 29, 2019, Geneva, (Motion Picture Expert Group or ISO/IEC JTC1/SC29/WG11), No. m47960, Mar. 24, 2019 (Mar. 24, 2019), XP030212402, 7 Pages.

Hsu C-W., et al., "CE4-related: On Merge List Construction", JVET-N0851, Joint Video Experts Team (JVET) of ITU-T SG 16 WP 3 and ISO/IEC JTC 1/SC 29/WG 11, 14th Meeting, Geneva, CH, Mar. 19-27, 2019, XP030204829, pp. 1-7.

International Search Report and Written Opinion—PCT/US2022/072680—ISA/EPO—Sep. 23, 2022.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-W2017-v1, Joint Video Experts Team (JVET) of ITU-T SG 16 WP 3 and ISO/IEC JTC 1/SC 29 24th Meeting, by teleconference, Oct. 6-15, 2021, pp. 1-7.

Su Y-C., et al., "CE4-related: Generalized Bi-prediction Improvements Combined from JVET-L0197 and JVET-L0296", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0646-v5, pp. 1-6.

Wen H.U., et al., "A VVC Proposal With Quaternary Tree Plus Binary-Ternary Tree Coding Block Structure and Advanced Coding Techniques", IEEE Transactions on Circuits and Systems for Video Technology, IEEE, USA, vol. 30, No. 5, Oct. 4, 2019 (Oct. 4, 2019), pp. 1311-1325, XP011786743, ISSN: 1051-8215, DOI: 10.1109/TCSVT.2019.2945048 [Retrieved on May 4, 2020].

Zhang (Bytedance) N., et al., "AHG12: Adaptive Reordering of Merge Candidates with Template Matching", 22. IVET Meeting, Apr. 20, 2021-Apr. 28, 2021, Teleconference, (The Joint Video Exploration Team of ISO/IEC JTC1/SC29/WG11 and ITU-T SG.16), No. JVET-V0099, m56511, Apr. 14, 2021 (Apr. 14, 2021), XP030294224, 4 Pages.

Zhao L., et al., "Non-EE2: Template Matching Based Merge Candidate List Construction (TM-MCLC)", JVET-X0087-v2, Joint Video Experts Team (JVET) of ITU-T SG 16 WP 3 and ISO/IEC JTC 1/SC 29 24th Meeting, by teleconference, Oct. 6-15, 2021, pp. 1-3.

\* cited by examiner

POSITION OF SPATIAL MERGE CANDIDATES

MERGE CANDIDATE REORDERING IN VIDEO CODING

This application claims the benefit of U.S. Provisional Patent Application No. 63/216,432, filed Jun. 29, 2021, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter-prediction in video codecs. More specifically, this disclosure describes techniques for merge candidate list reordering. A video coder may be configured to construct a merge candidate list with a first number (N1) of candidates, and then reorder the candidates in the list according to some predetermined reordering criterion. The reordering criterion may be based on a cost value and/or a mode of inter-prediction (e.g., bi-prediction). The video coder may then truncate the reordered merge candidate list to have a second number (N2) of candidates that is less than the first number of candidates (e.g., N2<N1). In this way, the more likely to be used candidates are at the beginning of the merge candidate list, and are thus more likely to be signaled with a lower index. Accordingly, the techniques of this disclosure may improve coding efficiency and/or reduce distortion.

In one example, a method includes constructing a merge candidate list of merge candidates, wherein the merge candidate list has N1 candidates, N1 being a positive integer value, reordering the merge candidates in the merge candidate list to create a reordered merge candidate list, reducing the reordered merge candidate list to create an output merge candidate list, wherein the output merge candidate list has N2 candidates, wherein N2 is less than N1, and coding a block of video data using the output merge candidate list.

In another example, a device includes a memory and one or more processors configured to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and code a block of video data using the output merge candidate list.

In another example, a device includes means for constructing a merge candidate list of merge candidates, wherein the merge candidate list has N1 candidates, N1 being a positive integer value, means for reordering the merge candidates in the merge candidate list to create a reordered merge candidate list, means for reduce the reordered merge candidate list to create an output merge candidate list, wherein the output merge candidate list has N2 candidates, wherein N2 is less than N1, and means for coding a block of video data using the output merge candidate list.

In another example, a computer-readable storage medium is encoded with instructions that, when executed, cause a programmable processor to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and code a block of video data using the output merge candidate list.

The details of one or more examples are set forth in the accompanying drawings and the description below. Other features, objects, and advantages will be apparent from the description, drawings, and claims.

DETAILED DESCRIPTION

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure are directed to inter prediction in video codecs, and more specifically, to merge candidate list reordering. A video coder may be configured to construct a merge candidate list with a first number (N1) of candidates, and then reorder the candidates in the list according to some predetermined reordering criterion. The reordering criterion may be based on a cost value and/or a mode of inter-prediction (e.g., bi-prediction). The video coder may then truncate the reordered merge candidate list to have a second number (N2) of candidates that is less than the first number of candidates (e.g., N2<N1). In this way, the more likely to be used candidates are at the beginning of the merge candidate list, and are thus more likely to be signaled with a lower index. Accordingly, the techniques of this disclosure may improve coding efficiency and/or reduce distortion.

Figure 1:
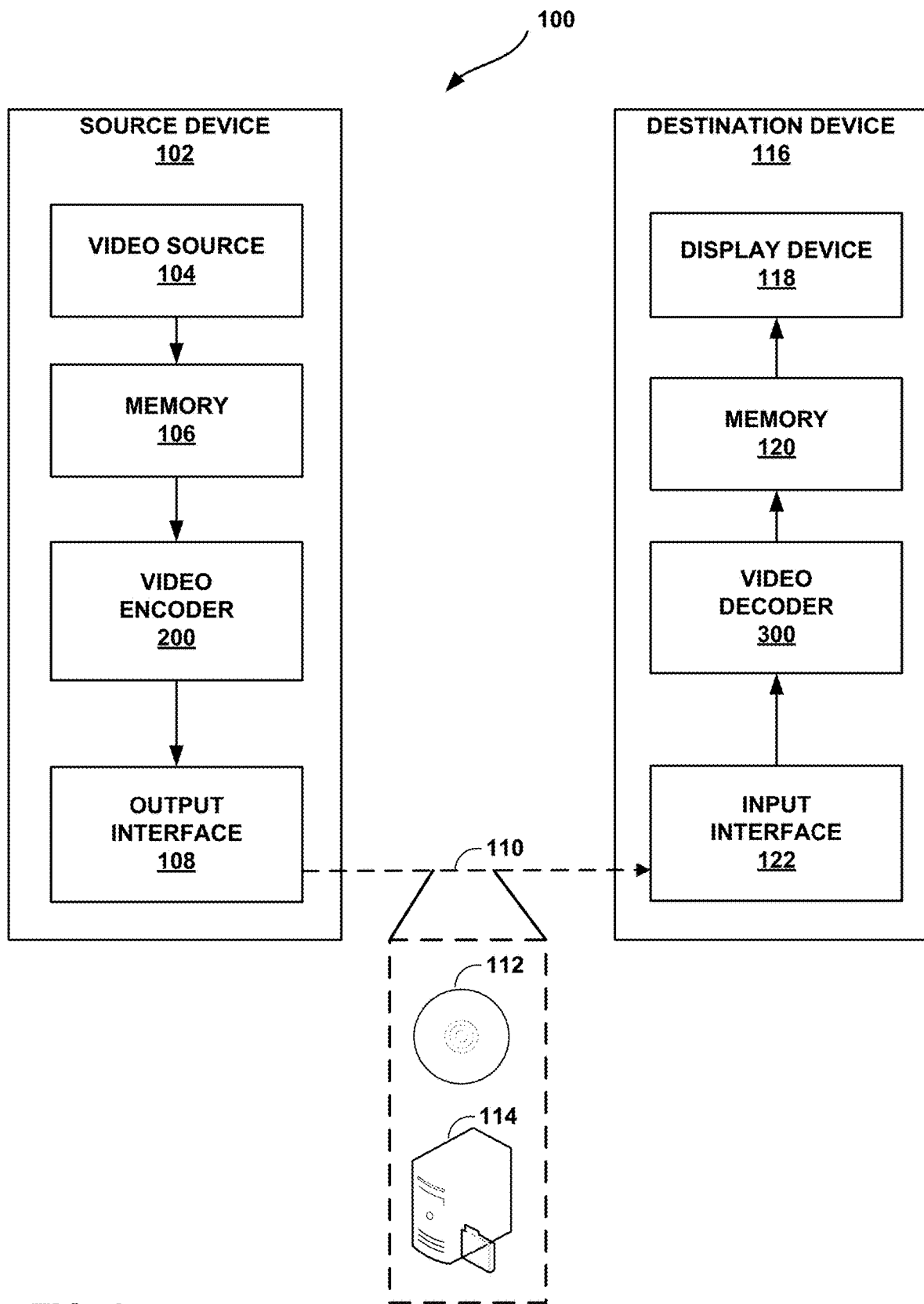
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for merge candidate reordering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for merge candidate reordering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that uses motion vector prediction candidate list, including merge candidate lists.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTB s is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra-prediction (e.g., intra frame prediction or spatial prediction) and inter-prediction (e.g., inter frame prediction or temporal prediction). In the context of AV1, when predicting blocks of a current frame of video data using an intra-prediction mode, video encoder 200 and video decoder 300 do not use video data from other frames of video data. For most intra-prediction modes, video encoder 200 encodes blocks of a current frame based on the difference between sample values in the current block and predicted values generated from reference samples in the same frame. Video encoder 200 determines predicted values generated from the reference samples based on the intra-prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be described in more detail below, video encoder 200 and/or video decoder 300 may be configured to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and code a block of video data using the output merge candidate list.

Inter-Prediction in the Versatile Video Coding (VVC) Standard

For each inter-predicted CU in VVC, motion parameters including motion vectors, reference picture indices, and reference picture list usage index, as well as any additional information used for the coding features of VVC, are used for inter-predicted sample generation. The motion parameters can be signalled in an explicit manner or derived at video decoder 300 in an implicit manner. When a CU is coded with skip mode, the CU is associated with one PU and has no significant residual coefficients, no coded motion vector delta, or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. An alternative to merge mode is the explicit transmission of motion parameters, where a motion vector, corresponding reference picture index for each reference picture list, and reference picture list usage flag, as well as any other needed information, are signalled explicitly per each CU.

Beyond the inter coding features in HEVC, VVC includes a number of new and refined inter-prediction coding tools listed as follows:

Extended merge prediction
Merge mode with motion vector difference (MMVD)
Symmetric MVD (SMVD) signalling
Affine motion compensated prediction
Subblock-based temporal motion vector prediction (SbTMVP)
Adaptive motion vector resolution (AMVR)
Motion field storage: $1/16^{th}$ luma sample MV storage and 8×8 motion field compression
Bi-prediction with CU-level weight (BCW)
Bi-directional optical flow (BDOF)
Decoder side motion vector refinement (DMVR)
Geometric partitioning mode (GPM)
Combined inter and intra-prediction (CIIP)
Extended Merge Prediction In VVC regular merge mode, the merge candidate list is constructed by including the following five types of candidates, in order:
1) Spatial motion vector predictors (MVPs) from spatial neighbour CUs
2) Temporal MVPs from collocated CUs
3) History-based MVP from a first-in, first-out (FIFO) table
4) Pairwise average MVP
5) Zero MVs.

The size of a merge candidate list is signalled in a sequence parameter set (SPS) header and the maximum allowed size of the merge candidate list is 6. For each CU coded in merge mode, an index of the best merge candidate is encoded using truncated unary binarization (TU).

The derivation process of the categories of merge candidates is described below. As is done in HEVC, VVC also supports parallel derivation of the merging candidate lists for all CUs within a certain size of area.

Spatial Candidates Derivation

Figure 2:
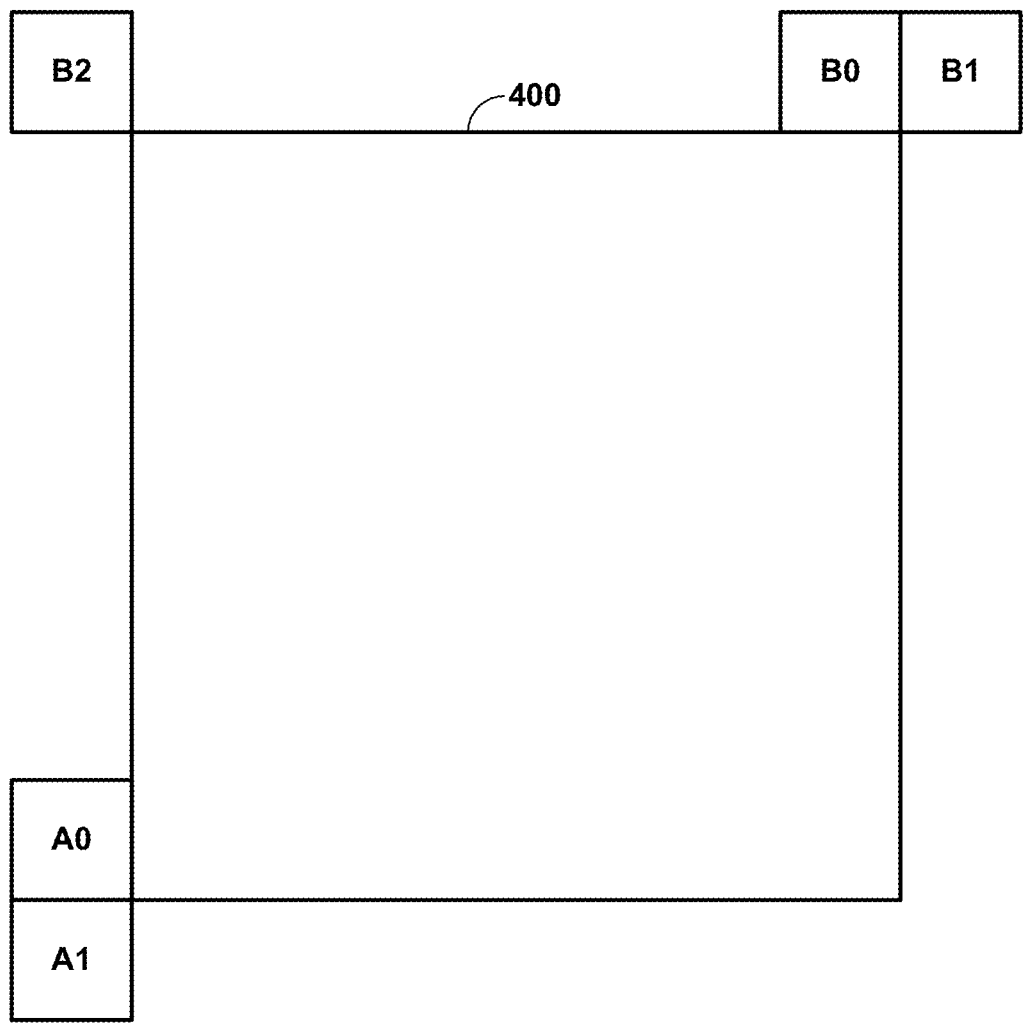
FIG. 2 is a conceptual diagram illustrating example spatial merge candidates.

The derivation of spatial merge candidates in VVC is similar to that in HEVC, except the positions of first two merge candidates are swapped. A maximum of four merge candidates are selected among candidates located in the positions depicted in FIG. 2 relative to current CU 400. The order of derivation is $B_0$, $A_0$, $B_1$, $A_1$ and $B_2$. Position $B_2$ is considered only when one (or more than one) of the CUs at positions $B_0$, $A_0$, $B_1$, $A_1$ are not available (e.g. because such CUs are in another slice or tile) or such CUs are intra coded. After the candidate at position $A_1$ is added to the merge candidate list, the addition of the remaining candidates is subject to a redundancy check which ensures that candidates with the same motion information are excluded from the list so that coding efficiency is improved.

Temporal Candidate Derivation

Figure 3:
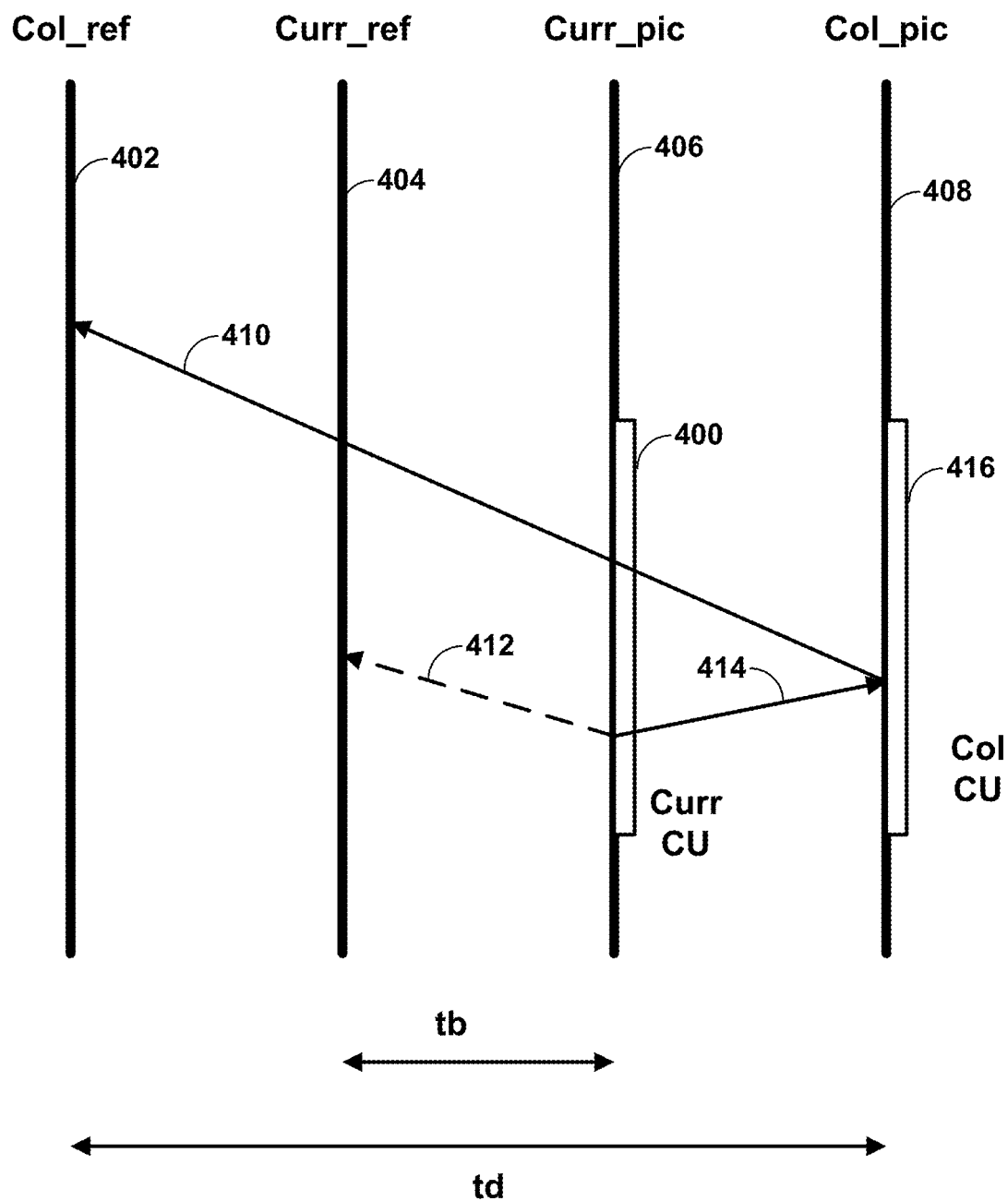
FIG. 3 is a conceptual diagram illustrating motion vector scaling for a temporal merge candidate.

In this step, only one candidate is added to the merge candidate list. Particularly, in the derivation of this temporal merge candidate, a scaled motion vector is derived based on a co-located CU belonging to the collocated reference picture. The reference picture list to be used for derivation of the co-located CU is explicitly signaled in the slice header. The scaled motion vector 412 for the temporal merge candidate is obtained, as illustrated by the dotted line in FIG. 3. The scaled motion vector 412 for current CU 400 (Curr CU) is scaled from the motion vector 410 of the co-located CU 416 (Col CU) using the picture order count (POC) distances, tb and td. Motion vector 414 is the motion vector between current CU 400 and collocated CU 416. The POC distance tb is defined to be the POC difference between the reference picture 404 (Curr_ref) of the current picture and the current picture 406 (Curr_pic). The POC difference td is defined to be the POC difference between the reference picture 402 (Col_ref) of the co-located picture and the co-located picture 408 (Col_pic). The reference picture index of the temporal merge candidate is set equal to zero.

Figure 4:
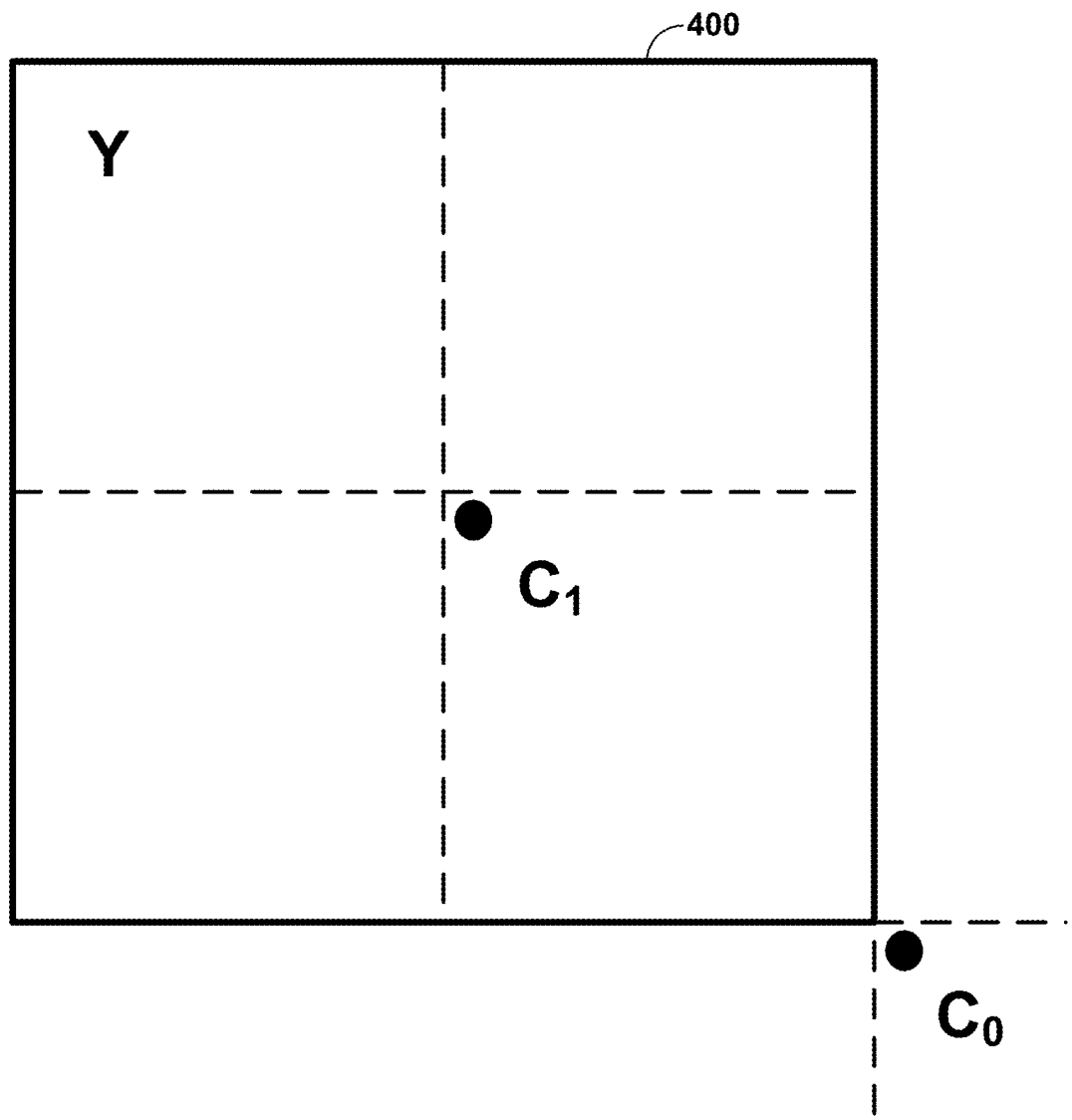
FIG. 4 is a conceptual diagram illustrating candidate positions for a temporal merge candidate.

The position for the temporal candidate for current CU 400 (e.g., which may be a luma (Y) block) is selected between candidates $C_0$ and $C_1$, as depicted in FIG. 4. If the CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

History-based MVP (HMVP) merge candidates may be added to the merge candidate list after the spatial MVP candidates and TMVP candidate. In one example, the motion information of a previously coded block is stored in a table (e.g., HMVP table) and used as a motion vector predictor (MVP) for the current CU. The table with multiple HMVP candidates is maintained during the encoding/decoding process. The table is reset (e.g., emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule may be utilized, wherein a redundancy check is first applied to determine whether there is an identical HMVP in the table.

If found, the identical HMVP is removed from the table and all the HMVP candidates afterwards are moved forward.

HMVP candidates could be used in the merge candidate list construction process. In one example, the latest several HMVP candidates in the table are checked in order and inserted to the candidate list after the TMVP candidate. A redundancy check is applied on the HMVP candidates to the spatial candidates or the temporal merge candidate.

To reduce the number of redundancy check operations, the following simplifications may be introduced:
1. The number of used candidates used for merge list generation is set as (N<=4) ? M: (8−N), wherein N indicates a number of existing candidates in the merge list and M indicates a number of available HMVP candidates in the table.
2. Once the total number of available merge candidates reaches the maximally allowed merge candidates minus 1, the merge candidate list construction process from the HMVP table is terminated.

Pair-Wise Average Merge Candidate Derivation

Pair-wise average candidates are generated by averaging predefined pairs of candidates in the existing merge candidate list. In one example, the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use that motion vector directly; if no motion vector is available, keep this list invalid.

When the merge list is not full after pair-wise average merge candidates are added, zero MVPs are inserted to the end of the merge candidate list until the maximum merge candidate number is achieved.

Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals. An example is as follows:

$P_{bi-pred}=((8-w)*P_0 w*P_1+4)>>3$, $P_{bi-pred}$ is the bi-prediction signal, w is a weight, $P_0$ is a prediction signal from a reference picture in a first reference picture list (List 0), and $P_1$ is a prediction signal from a reference picture in a section reference picture list (List 1). The operator >> is a bitwise right shift.

Five weights are allowed in the weighted averaging bi-prediction, w∈{−2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. In one example, BCW is only applied to CUs with 256 or more luma samples (i.e., CU width times CU height is greater than or equal to 256). For low-delay pictures, all 5 weights are used. For non-low-delay pictures, only 3 weights (w∈{3,4,5}) are used.

At the encoder, fast search algorithms are applied to find the weight index without significantly increasing the encoder complexity. These algorithms are summarized as follows. Further details may be found in VVC Test Model (VTM) software and document Yu-Chi Su, et. al. "CE4-related: Generalized bi-prediction improvements combined from JVET-L0197 and JVET-L0296," Joint Video Experts Team (WET) of ITU-T SG 16 WP 3 and ISO/IEC JTC 1/SC 29/WG 11, 12th Meeting: Macao, CN, 3-12 Oct. 2018 ("JVET-L0646"). When combined with AMVR, unequal weights are only conditionally checked for 1-pel and 4-pel motion vector precisions if the current picture is a low-delay picture.

When combined with affine mode, affine motion estimation (ME) will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between the current picture and its reference pictures, the coding QP, and the temporal level.

The BCW weight index is coded using one context coded bin followed by bypass coded bins. The first context coded bin indicates if equal weights are used; and if unequal weight are used, additional bins are signalled using bypass coding to indicate which unequal weights are used.

Weighted prediction (WP) is a coding tool supported by the H.264/AVC and HEVC standards to efficiently code video content with fading. Support for WP was also added into the VVC standard. WP allows weighting parameters (e.g., weight and offset) to be signalled for each reference picture in each of the reference picture lists L0 and L1. Then, during motion compensation, the weight(s) and offset(s) of the corresponding reference picture(s) are applied.

WP and BCW are designed for different types of video content. In order to avoid interactions between WP and BCW, which will complicate VVC decoder design, if a CU uses WP, then the BCW weight index is not signalled, and w is inferred to be 4 (e.g., equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

Decoder-Side Motion Vector Refinement in VVC

Figure 5:
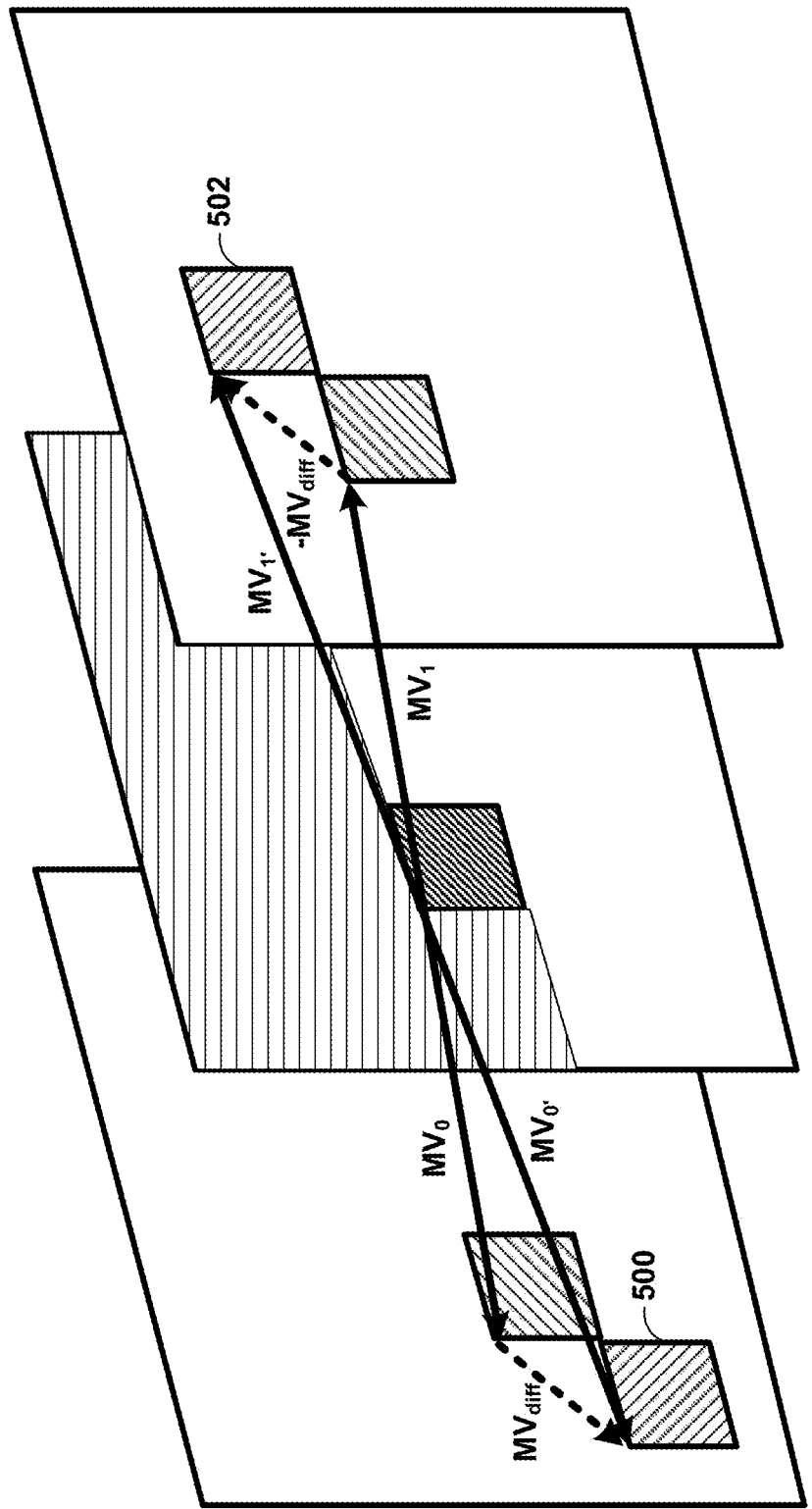
FIG. 5 is a conceptual diagram illustrating an example of bilateral matching.

In VVC, bilateral-matching (BM) based decoder side motion vector refinement (DMVR) is applied to increase the accuracy of the MVs of a bi-prediction merge candidate. The BM method includes calculating the sum of absolute differences (SAD) between the two candidate blocks in the reference picture list L0 and list L1. As illustrated in FIG. 5, the SAD between block 500 and block 502 based on each MV candidate around the initial MV is calculated. The MV candidate with the lowest SAD becomes the refined MV and used to generate the bi-predicted signal. The SAD of the initial MVs is subtracted by ¼ of the SAD value to serve as regularization term. The temporal distances (e.g., Picture Order Count (POC) difference) from two reference pictures to the current picture shall be the same, therefore, the MVD0 is just the opposite sign of MVD1.

The refinement search range is two integer luma samples from the initial MV. The searching includes an integer sample offset search stage and a fractional sample refinement stage. A twenty-five (25) points full search is applied for integer sample offset searching. The SAD of the initial MV pair is first calculated. If the SAD of the initial MV pair is smaller than a threshold, the integer sample stage of DMVR is terminated. Otherwise, SADs of the remaining 24 points are calculated and checked in raster scanning order. The point with the smallest SAD is selected as the output of integer sample offset searching stage.

The integer sample search is followed by a fractional sample refinement. To lower calculational complexity, the fractional sample refinement is derived by using a parametric error surface equation instead of an additional search with an SAD comparison. The fractional sample refinement is conditionally invoked based on the output of the integer sample search stage. When the integer sample search stage is terminated with the center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-u_{min})^2 C, \quad (1)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))) \quad (2)$$

$$y_{min}=(E(0,-1)-E(0,1))/(2((E(0,-1)+E(0,1)-2E(0,0))) \quad (3)$$

The value of $x_{min}$ and $y_{min}$ are automatically constrained to be between −8 and 8 since all cost values are positive and the smallest value is E(0,0). This corresponds to half pel offset with 1/16 th-pel MV accuracy in VVC. The computed fractional $(x_{min}, Y_{min})$ is added to the integer distance refinement MV to get the sub-pixel accurate refinement delta MV.

In VVC, the resolution of the MVs is 1/16 luma samples. The samples at the fractional position are interpolated using an 8-tap interpolation filter. In DMVR, the search points surround the initial fractional-pel MV with integer sample offset. Therefore, the samples of those fractional position are interpolated for the DMVR search process. To reduce the calculation complexity, a bi-linear interpolation filter is used to generate the fractional samples for the searching process in DMVR. Another important effect is that, by using a bi-linear filter with a 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal motion compensation process, the samples, which are not needed for the interpolation process based on the original MV, but is needed for the interpolation process based on the refined MV, will be padded from those available samples.

When the width and/or height of a CU is larger than 16 luma samples, the CU will be further split into subblocks with width and/or height equal to 16 luma samples for the DMVR process.

In VVC, the DMVR can be applied for the CUs which are coded with following modes and features:
  CU level merge mode with bi-prediction MV
  One reference picture is in the past and another reference picture is in the future with respect to the current picture
  The distances (e.g., POC difference) from two reference pictures to the current picture are the same
  Both reference pictures are short-term reference pictures
  CU has more than 64 luma samples
  Both CU height and CU width are larger than or equal to 8 luma samples
  BCW weight index indicates equal weight
  WP is not enabled for the current block
  CIIP mode is not used for the current block Bi-Directional Optical Flow Bi-directional optical flow (BDOF) is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in an example BDOF process.

First, the horizontal and vertical gradients, $$\frac{\partial I^{(k)}}{\partial x}(i,j) \text{ and } \frac{\partial I^{(k)}}{\partial y}(i,j),$$

k=1,1, of the two prediction signals are computed by directly calculating the difference between two neighboring samples, e.g., as:

$$\frac{\partial I^{(k)}}{\partial x}(i,j) = (I^{(k)}(i+1,j) \gg \text{shift1}) - (I^{(k)}(i-1,j) \gg \text{shift1}) \quad (1\text{-}6\text{-}1)$$

$$\frac{\partial I^{(k)}}{\partial y}(i,j) = (I^{(k)}(i,j+1) \gg \text{shift1}) - (I^{(k)}(i,j-1) \gg \text{shift1}),$$

where $I^{(k)}(i,j)$ are the sample value at coordinate (i,j) of the prediction signal in list k, k=0,1, and shift1 is calculated based on the luma bit depth, bitDepth, as shift1 is set to be equal to 6.

Then, the auto- and cross-correlation of the gradients, $S_1$, $S_2$, $S_3$, $S_5$ and $S_6$, are calculated as:

$$S_1 = \sum_{(i,j)\in\Omega} |\psi_x(i,j)|, \quad (1\text{-}6\text{-}2)$$

$$S_3 = \sum_{(i,j)\in\Omega} \theta(i,j) \cdot (-\text{sign}(\psi_x(i,j)))$$

$$S_2 = \sum_{(i,j)\in\Omega} \psi_x(i,j) \cdot (\psi_y(i,j))$$

$$S_5 = \sum_{(i,j)\in\Omega} |\psi_y(i,j)|$$

$$S_6 = \sum_{(i,j)\in\Omega} \theta(i,j) \cdot (\psi_y(i,j)),$$

where $$\psi_x(i,j) = \left(\frac{\partial I^{(1)}}{\partial x}(i,j) + \frac{\partial I^{(0)}}{\partial x}(i,j)\right) \gg \text{shift3} \quad (1\text{-}6\text{-}3)$$

$$\psi_y(i,j) = \left(\frac{\partial I^{(1)}}{\partial y}(i,j) + \frac{\partial I^{(0)}}{\partial y}(i,j)\right) \gg \text{shift3}$$

$$\theta(i,j) = (I^{(0)}(i,j) \gg \text{shift2}) - (I^{(1)}(i,j) \gg \text{shift2}),$$

where Ω is a 6×6 window around the 4×4 sub-block, the value of shift2 is set to be equal to 4, and the value of shift3 is set to be equal to 1.

The motion refinement $(v_x, v_y)$ is then derived using the cross- and auto-correlation terms using the following:

$$v_x=S_1>0?\text{clip3}(-th'_{BIO},th'_{BIO},-((S_3<<2)>>\lfloor\log_2 S_1\rfloor)):0$$

$$v_y=S_5>0?\text{clip3}(-th'_{BIO},th'_{BIO},-(((S_6<<2)-((v_x\cdot S_2))\\>>1))>>\lfloor\log_2 S_5\rfloor)):0, \quad (1\text{-}6\text{-}4)$$

where, $th'_{BIO}=1<<4$. $\lfloor\cdot\rfloor$ is the floor function.

Based on the motion refinement and the gradients, the following adjustment is calculated for each sample in the 4×4 sub-block:

$$b(x,y)= \\ v_x\cdot\left(\frac{\partial I^{(1)}(x,y)}{\partial x}-\frac{\partial I^{(0)}(x,y)}{\partial x}\right)+v_y\cdot\left(\frac{\partial I^{(1)}(x,y)}{\partial y}-\frac{\partial I^{(0)}(x,y)}{\partial y}\right) \quad (1\text{-}6\text{-}5)$$

Finally, the BDOF samples of the CU are calculated by adjusting the bi-prediction samples as follows:

$$\text{pred}_{BDOF}(x,y)=(I^{(0)}(x,y)+I^{(1)}(x,y)+b(x,y)+o_{\textit{offset}})\\>>\text{shift5}, \quad (1\text{-}6\text{-}6)$$

wherein, shift5 is set equal to Max(3, 15−BitDepth) and the variable $o_{\textit{offset}}$ is set equal to $(1<<(\text{shift5}-1))$.

These values are selected such that the multipliers in the BDOF process do not exceed 15-bits, and the maximum bit-width of the intermediate parameters in the BDOF process is kept within 32-bits.

Figure 6:
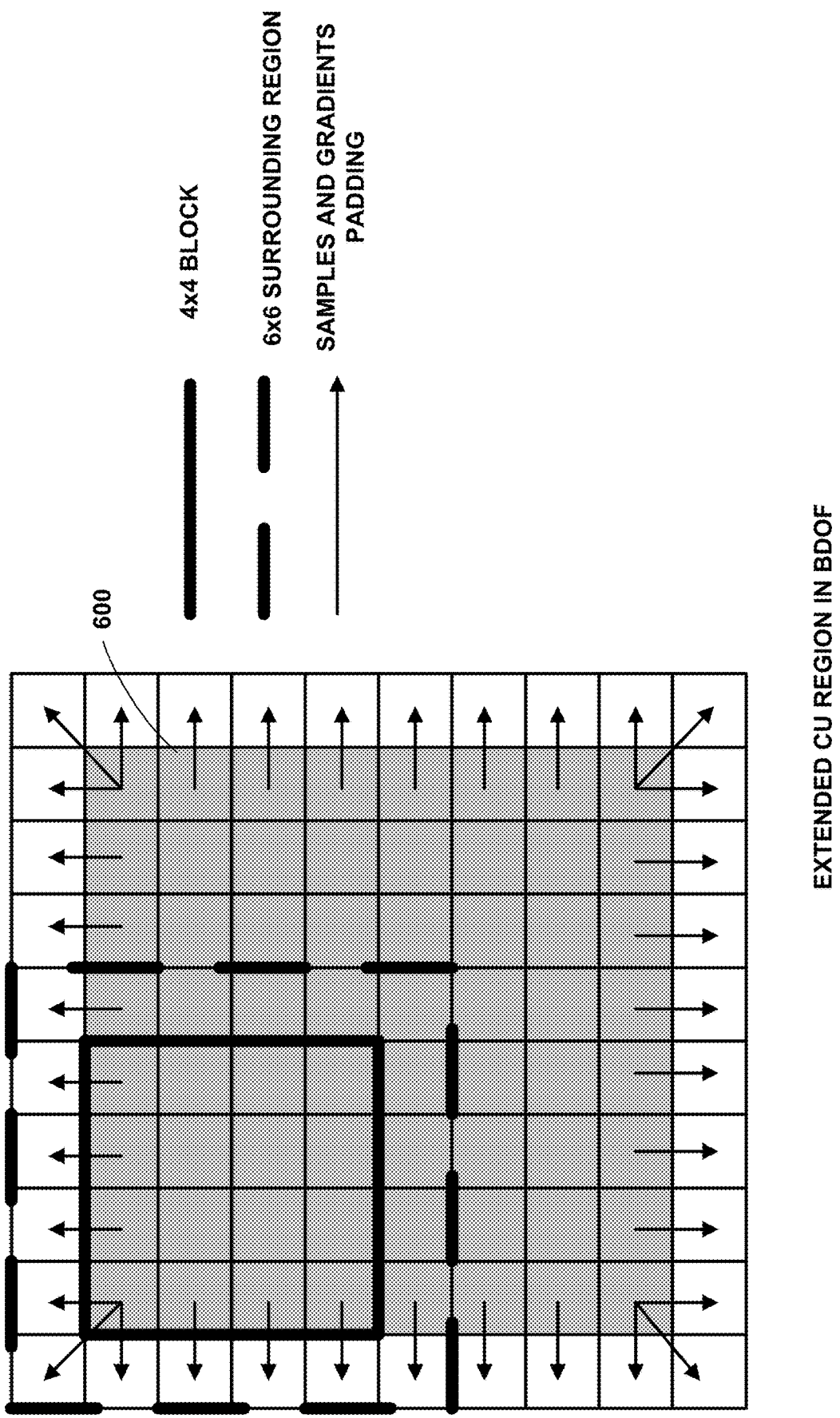
FIG. 6 is a conceptual diagram illustrating an extended coding unit region used in bi-directional optical flow.

In order to derive the gradient values, some prediction samples $I^{(k)}(i,j)$ in list k (k=0,1) outside of the current CU boundaries need to be generated. As depicted in FIG. 6, the BDOF uses one extended row/column around the boundaries of CU 600. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (e.g., repeated) from their nearest neighbors.

Figure 7:
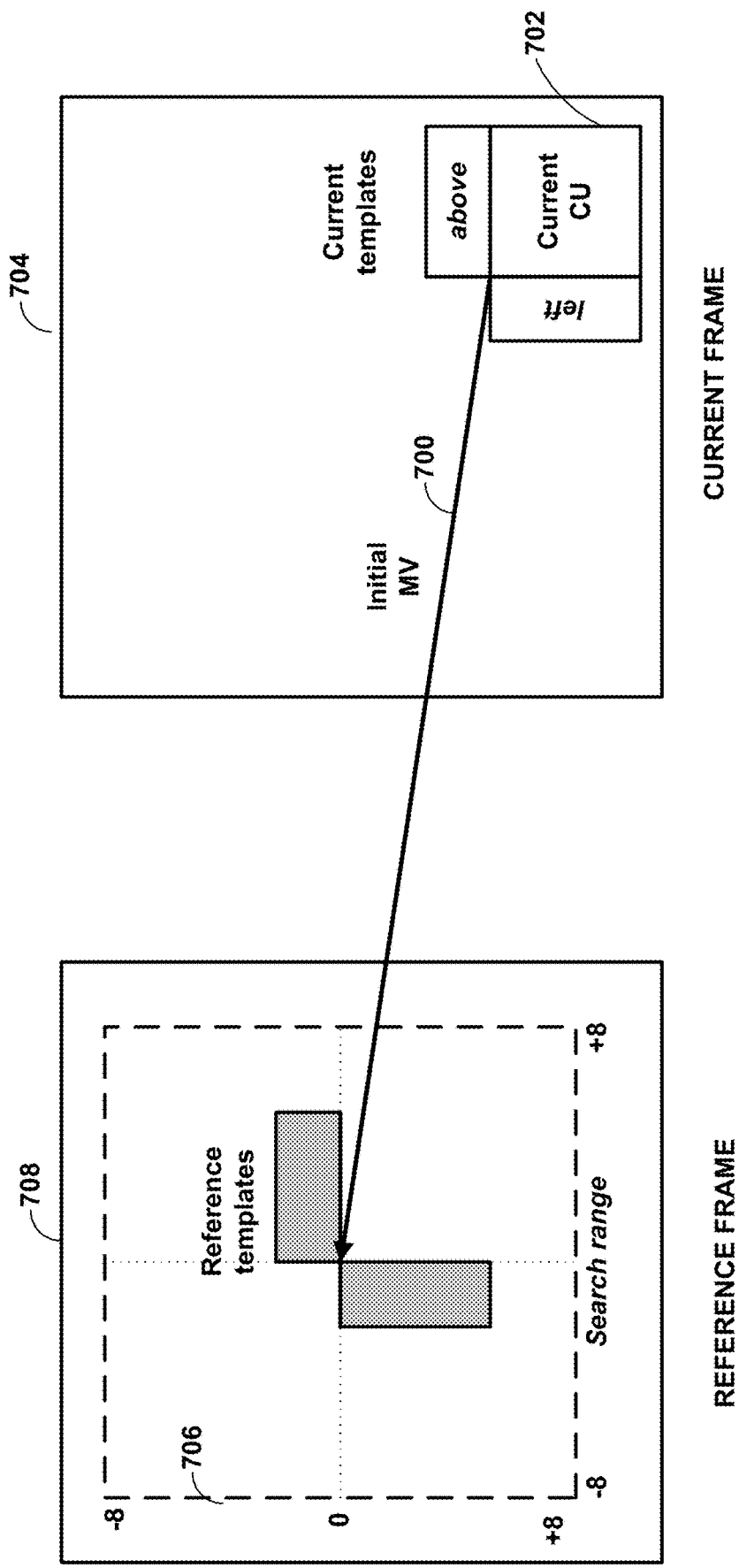
FIG. 7 is a conceptual diagram illustrating template matching performance on a search area around an initial motion vector.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The CU is not coded using affine mode or the SbTMVP merge mode CU has more than 64 luma samples Both CU height and CU width are larger than or equal to 8 luma samples BCW weight index indicates equal weight WP is not enabled for the current CU CIIP mode is not used for the current CU Template Matching Template matching (TM) is a decoder-side MV derivation method to refine the motion information of the current CU by finding the closest match between a template (e.g., top and/or left neighbouring blocks of the current CU) in the current picture and a block (e.g., a block the same size as the template) in a reference picture. As illustrated in FIG. 7, a better MV is to be searched around the initial motion vector 700 of the current CU 702 of current frame 704 within a [−8, +8]-pel search range 706 in reference frame 708. With an AMVP candidate selected based on initial matching error, its MVP is refined by template matching. With a merge candidate indicated by signaled merge index, its merged MVs corresponding to L0 and L1 are refined independently by template matching and then the less accurate motion vector is further refined again with the better motion vector as a prior.

Cost function: When a motion vector points to a fractional sample position, motion compensated interpolation is used. To reduce complexity, bi-linear interpolation instead of a regular 8-tap DCT-IF interpolation is used for both template matching to generate templates on reference pictures. The matching cost C of template matching is calculated as follows:

$$C=\text{SAD}+w*(|MVx-MV^s x|+|MV_y-MV^s y|),$$

where w is a weighting factor which can be set to an integer number such as 0, 1, 2, 3 or 4, and MV and $MV^s$ indicate the currently testing MV and the initial MV (e.g., a MVP candidate in AMVP mode or merged motion in merge mode), respectively. SAD is used as the matching cost of template matching.

When TM is used, the motion is refined by using luma samples. The derived motion will be used for both luma and chroma for motion compensation inter-prediction. After the MV is determined, final motion compensation is performed using an 8-tap interpolation filter for luma components and a 4-tap interpolation filter for chroma components.

Search method: MV refinement is a pattern-based MV search with the criterion of template matching cost and a hierarchical structure. Two search patterns are supported—a diamond search and a cross search for MV refinement. The hierarchical structure specifies an iterative process to refine MV, starting at a coarse MVD precision (e.g., quarter-pel) and ending at a fine precision (e.g., ⅛-pel). The MV is directly searched at quarter luma sample MVD precision with diamond pattern, followed by quarter luma sample MVD precision with cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

The template matching proposed in Y. Chen, et. al. "Description of SDR, HDR and 360° video coding technology proposal by Qualcomm and Technicolor—low and high complexity versions," Joint Video Experts Team (JVET) of ITU-T SG 16 WP 3 and ISO/IEC JTC 1/SC 29/WG 11, 10th Meeting: San Diego, US, 10-20 Apr. 2018 ("JVET-J0021") and Yao-Jen Chang, et. al. "Compression efficiency methods beyond VVC," Joint Video Experts Team (JVET) of ITU-T SG 16 WP 3 and ISO/IEC JTC 1/SC 29/WG 11, 21st Meeting, by teleconference, 6-15 Jan. 2021 ("JVET-U0100") is applied to AMVP mode and merge mode in some examples.

The regular merge candidate list is constructed in the order of the following candidates:

Spatial MVPs from spatial neighbour CUs: first four (4) available candidates are selected among the order of Above neighbour CU (A), Left neighbour CU (L), Above-Right neighbour CU (AR), Left-Below neighbour CU (LB), Left-Above neighbour CU (LA).

A temporal MVP from collocated CUs: Only one candidate is added.

History-based MVP: The motion information of a previously coded block is stored in a table and used as an MVP for the current CU.

Pairwise average MVP: Pairwise average candidates are generated by averaging predefined pairs of candidates in the existing regular merge candidate list Zero MVs.

When TM is applied to merge mode, a separate TM merge candidate list is constructed by refining the MVPs of the regular merge candidates based on the template matching.

Merge Candidate Reordering

In some methods, the merge candidates may be reordered based on some criterion. For example:
1) The merge candidates may be reordered based on whether the candidate is a bi-prediction candidate. In this example, the bi-prediction candidate can be inserted before uni-prediction candidates.
2) The merge candidates may be reordered based on a template matching cost of the candidate.
3) The merge candidates may be reordered based on whether the candidate is a bi-prediction candidate and the bilateral matching cost of the bi-prediction candidate.

Merge Candidate Reordering Using Template Matching

In Na Zhang, et. al. "AHG12: Adaptive Reordering of Merge Candidates with Template Matching," Joint Video Experts Team (WET) of ITU-T SG 16 WP 3 and ISO/IEC JTC 1/SC 29/WG 11, 22nd Meeting, by teleconference, 20-28 Apr. 2021 ("JVET-V0099"), a merge candidate reordering method using template matching was proposed. The reordering method of JVET-V0099 is applied to regular merge mode, template matching (TM) merge mode, and affine merge mode (excluding the SbTMVP candidate). For the TM merge mode, merge candidates are reordered before the refinement process.

After a merge candidate list is constructed, merge candidates are divided into several subgroups. The subgroup size is set to 5 in one example. Merge candidates in each subgroup are reordered ascendingly according to cost values based on template matching. For simplification, merge candidates in the last, but not the first subgroup, are not reordered.

The template matching cost is measured by the sum of absolute differences (SAD) between samples of a template of the current block and their corresponding reference samples. The template comprises a set of reconstructed samples neighboring to the current block. Reference samples of the template are located by the same motion information of the current block.

Figure 8:
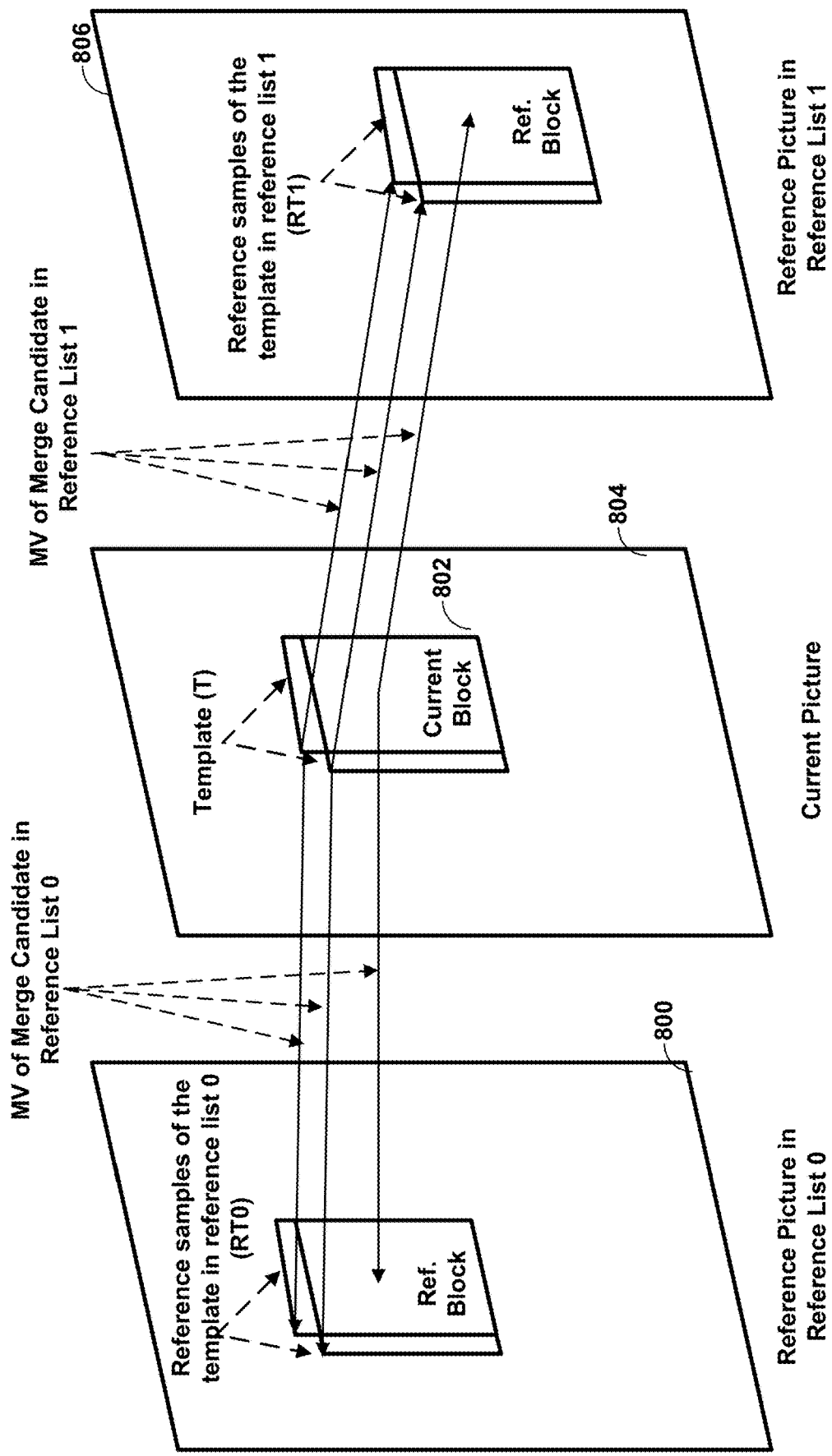
FIG. 8 is a conceptual diagram illustrating template and reference samples of a template in reference list 0 and reference list 1.

When a merge candidate utilizes bi-directional prediction, the reference samples of the template of the merge candidate are also generated by bi-prediction, as shown in FIG. 8. As shown in FIG. 8, reference samples in reference picture 800 of the template for reference list 0 (RT0) are identified by a motion vector of a merge candidate in reference list 0 relative to the template (T) of current block 800 in current picture 804. Reference picture 800 is a reference picture in reference list 0. Likewise, reference samples in reference picture 806 of the template for reference list 1 (RT1) are identified by a motion vector of a merge candidate in reference list 1 relative to the template (T) of current block 800 in current picture 804. Reference picture 806 is a reference picture in reference list 1.

Figure 9:
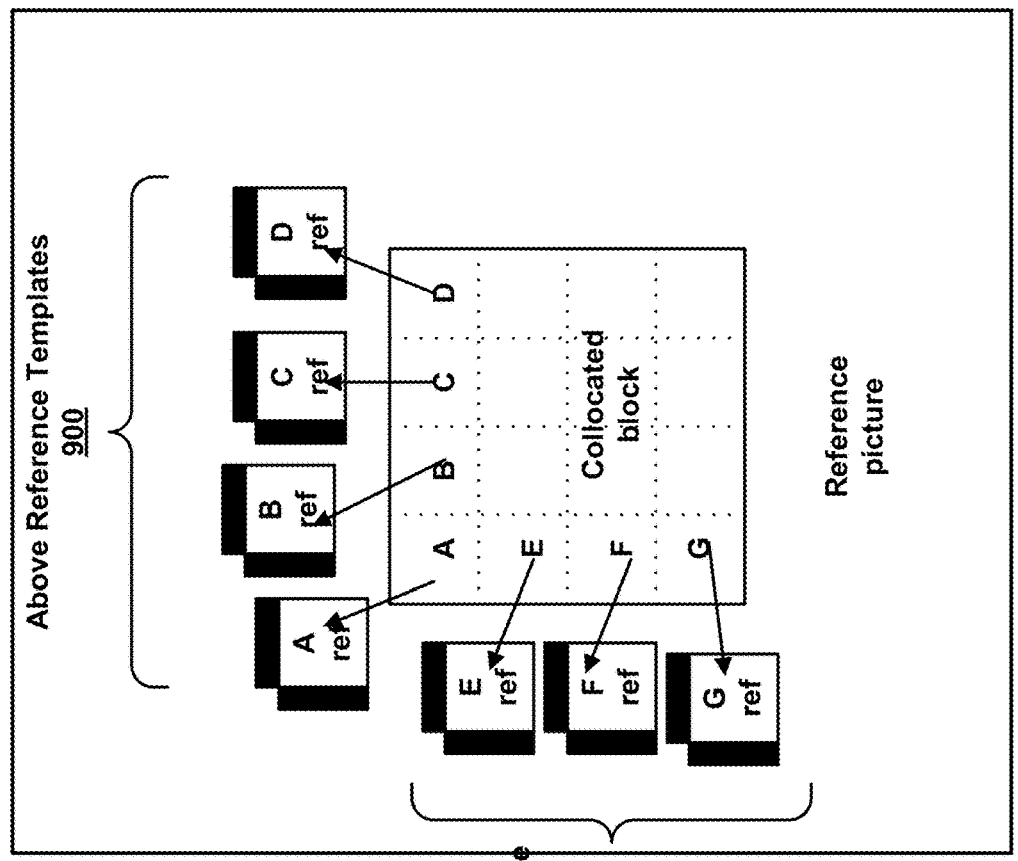
FIG. 9 is a conceptual diagram illustrating template and reference samples of a template for a block with sub-block motion using the motion information of the sub-blocks.
Figure 9:
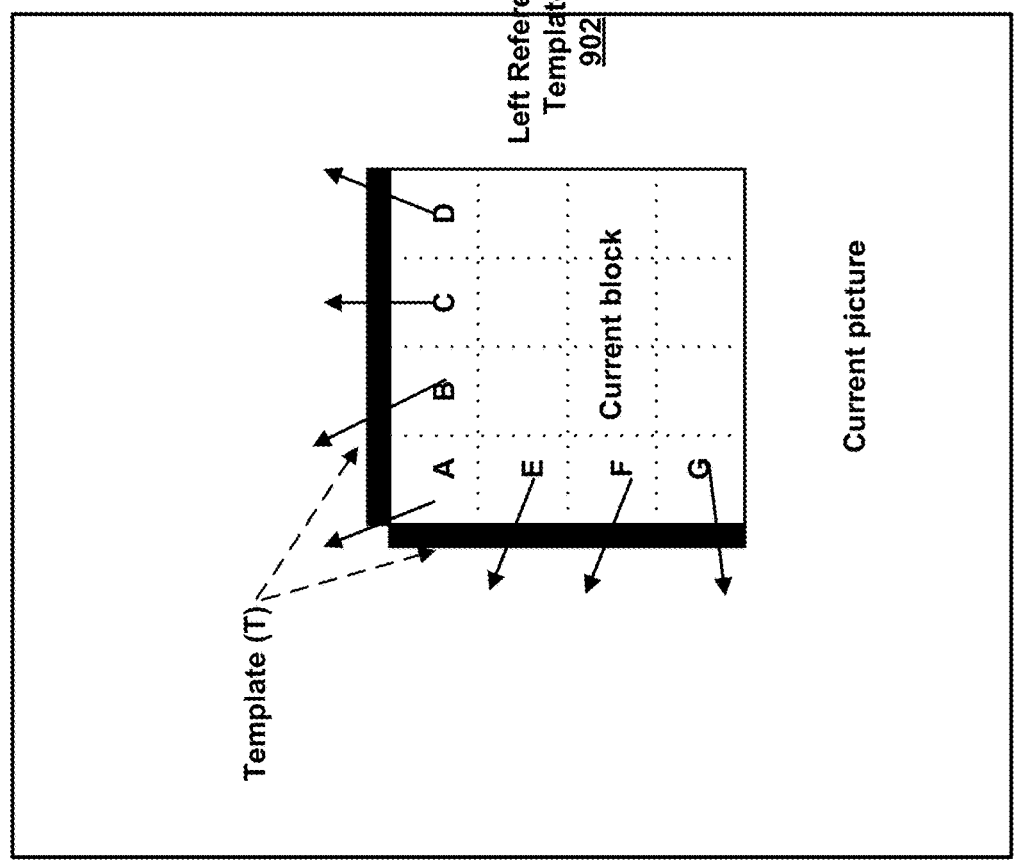

FIG. 9 is a conceptual diagram illustrating template and reference samples of a template for a block with sub-block motion using the motion information of the sub-blocks. For subblock-based merge candidates with subblock size equal to Wsub*Hsub, the above template comprises several sub-templates with the size of Wsub×1, and the left template comprises several sub-templates with the size of 1×Hsub. As shown in FIG. 9, the motion information of the subblocks in the first row (subblocks A, B, C, and D) and the first column (A, E, F, and G) of current block 910 is used to derive the reference samples of each sub-template in the above reference templates 900 and the left reference templates 902.

This disclosure describes the following techniques to improve merge candidate reordering. The techniques described below can be applied to any reordering criterion, for example, template matching cost, bilateral-matching cost, the use bi-prediction, or other reordering criteria. The techniques of this disclosure may be used in extensions to existing video coding standards, future video coding standards, or other video coding formats, including AV1 and successors to AV1, that use motion vector candidate lists, including merge candidate lists.

As described above, in some examples, a merge candidate reordering method uses template matching. The number of candidates in the input list is the same as the number of candidates in the output list. That is, some example merge candidate reordering techniques including reordering all possible candidates and then use all of the reordered candidates in a merge candidate list. In some applications where memory bandwidth is constrained, the template matching based candidates reordering method may not be desirable, as it requires accessing various locations in multiple reference pictures.

In one example, this disclosure describes techniques that may improve merge candidate list construction with reordering. The techniques described herein may be applied with any reordering criteria used to order the motion candidates in the merge candidate list, including template matching cost, bilateral-matching cost, the use of bi-prediction, or other reordering criteria.

In one example of the disclosure, video encoder 200 and video decoder 300 may be configured to perform the following process. First, video encoder 200 and video decoder 300 may be configured to construct a merge candidate list having N1 merge candidates. N1 is a positive integer value. The N1 merge candidates may include any combination of spatial merge candidates, temporal merge candidates, history-based merge candidates, and/or pair-wise average merge candidates. The merge candidate list construction techniques of this disclosure may also be used with bi-prediction, BCW, decoder-side motion vector refinement, BDOF, and template matching, as described above.

After video encoder 200 and video decoder 300 construct the merge candidate list with N1 candidates, video encoder 200 and video decoder 300 may reorder the merge candidate list. In one example, video encoder 200 and video decoder 300 may reorder the whole list (e.g., all N1 candidates) together. That is, video encoder 200 and video decoder 300 may apply the reordering criteria to all N1 candidates in the list. As described above, the reordering criteria may include template matching cost, bilateral-matching cost, the use of bi-prediction, or other reordering criteria.

In other examples, video encoder 200 and video decoder 300 reorder each subgroup of a plurality of subgroups of merge candidates in the list. For example, the reordering can be applied in subgroups of motion candidates, for example as described in JVET-V0099. Video encoder 200 and video decoder 300 may divide the merge candidate list into multiple subgroups, including subgroups of a predetermined size (e.g., 5 candidates). Video encoder 200 and video decoder 300 may reorder merge candidates in each subgroup, ascendingly, according to cost values based on template matching or another criterion.

In another example, video encode 200 and video decoder 300 may divide the merge candidate list with N1 candidates into multiple subgroups. Video encoder 200 and video decoder 300 may apply reordering only within each subgroup. For each subgroup, the merge candidates shall satisfy all the following condition:

If there is valid MV0 in reference list 0, the MV0 shall point to the same designated reference picture in reference list 0, and MV0 shall point to a designated bounding box within the reference picture.

If there is valid MV1 in reference list 1, the MV1 shall point to the same designated reference picture in reference list 1, and MV0 shall point to a designated bounding box within the reference picture.

In this way, only the reference pixels within a certain bounding box are accessed by the reordering process at video decoder 300.

Regardless of the reordering processing (e.g., the whole list or subgroups), video encoder 200 and video decoder 300 may reduce the reordered merge candidate list, such that the number of candidates is an integer number N2, where N2 is less than N1, for the output merge candidate list. Video encoder 200 and video decoder 300 discards the last N1-N2 candidates does not be used the discarded candidates when coding block. Video encoder 200 and video decoder 300 may then encode and decode, respectively, the block using the output merge candidate list having N2 candidates. In one example of list reduction, video encoder 200 and video decoder 300 may be configured to use the first N2 candidates in the reordered list for the final merge candidate list. That is, the first N2 candidates with the smallest cost when using a cost-based reordering criterion.

The combined reordering and merge candidate list reduction techniques of this disclosure allows for a large number of possible candidates (e.g., N1 candidates) to be considered, while ultimately only requiring video encoder 200 to test and signal indices for smaller number (e.g., N2 candidates) in the final merge candidate list. In addition, the more likely to be used candidates are at the beginning of the merge candidate list, and are thus more likely to be signaled with a lower index. Accordingly, the techniques of this disclosure may improve coding efficiency and/or reduce distortion.

Accordingly, in one example of the disclosure, video encoder 200 and/or video decoder 300 may be configured to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and code a block of video data using the output merge candidate list.

As described above, the initial merge candidate list includes a larger number of candidates than the final candidate list (after reordering) that is used for coding a block.

In one example, the values N1 and N2 may be both signaled in high level syntax. In one example, the values of N1 and N2 are signaled separately. In another example, one of the values of N1 or N2 is signaled separately, and the other is signaled as the difference between those two values. For example, the value of N1 can be signaled as N2+k, wherein k is larger than 0 and k is coded in the bitstream.

In another example, the value of N2 is signaled in high level syntax, and N1=N2+k, and k is a fixed integer positive value. The value k may be set differently for different merge modes.

In one example, the techniques of this disclosure may be applied on top of the method described in JVET_V0099 (e.g., the techniques described in the section titled Merge Candidate Reordering Using Template Matching). In the template matching merge mode, the maximum number of candidates for the initial merge candidate list is set to N1. After reordering based on the template matching cost, the maximum number of candidates for the output merge candidate list is set to N2, and N2<N1. The signaling of the merge index is based on the maximum of number candidates N2. For example, the truncated unary code is used for coding the merge index, with the maximum being N2−1.

Figure 10:
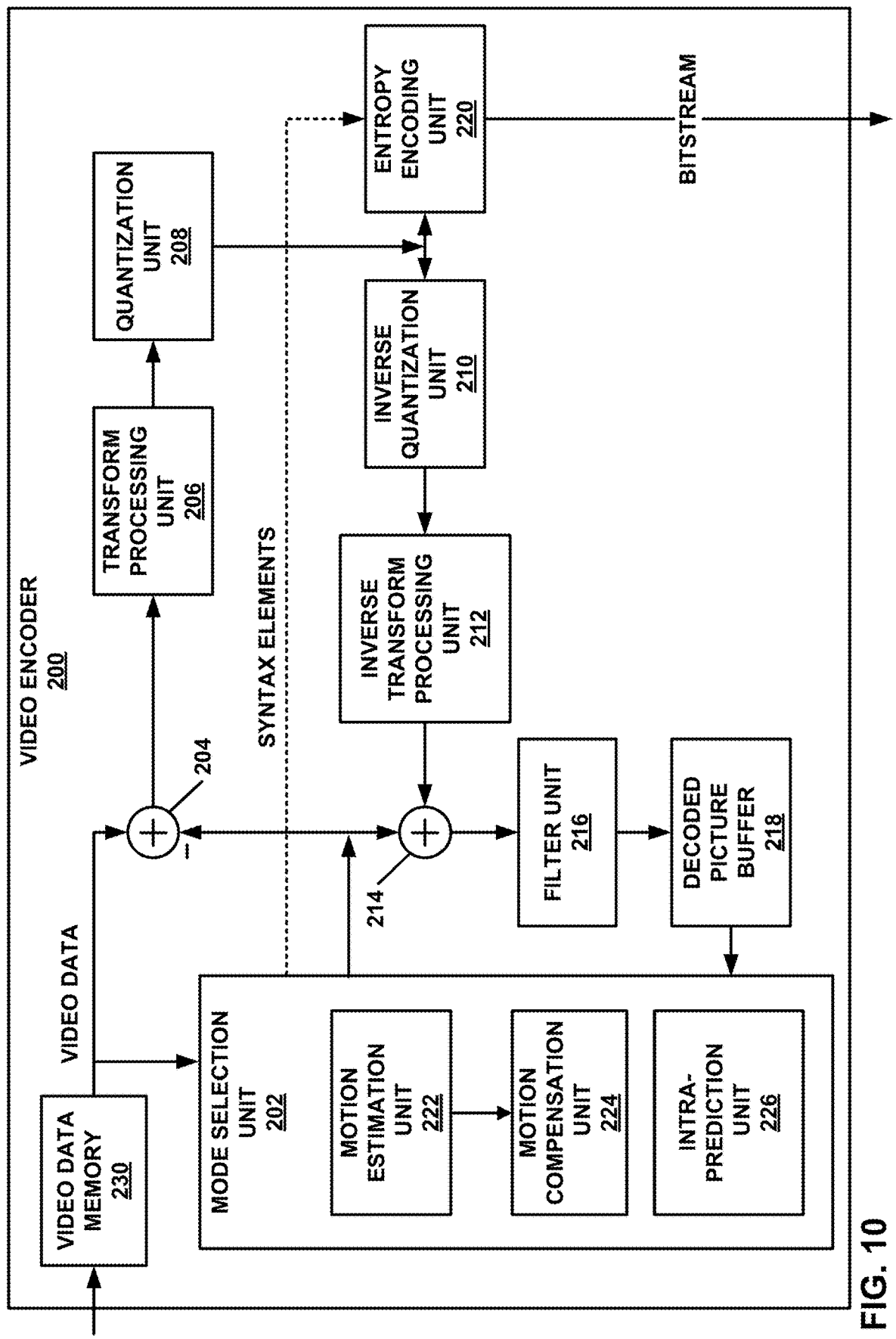
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra-prediction, non-directional intra-prediction, recursive filter intra-prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra-prediction, and symmetric PU sizes of 2N×2N, 2N×N, N×2N, N×N, or similar for inter-prediction. Video encoder 200 and video decoder 300 may also support asymmetric partitioning for PU sizes of 2N×nU, 2N×nD, nL×2N, and nR×2N for inter-prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and encode a block of video data using the output merge candidate list.

Figure 11:
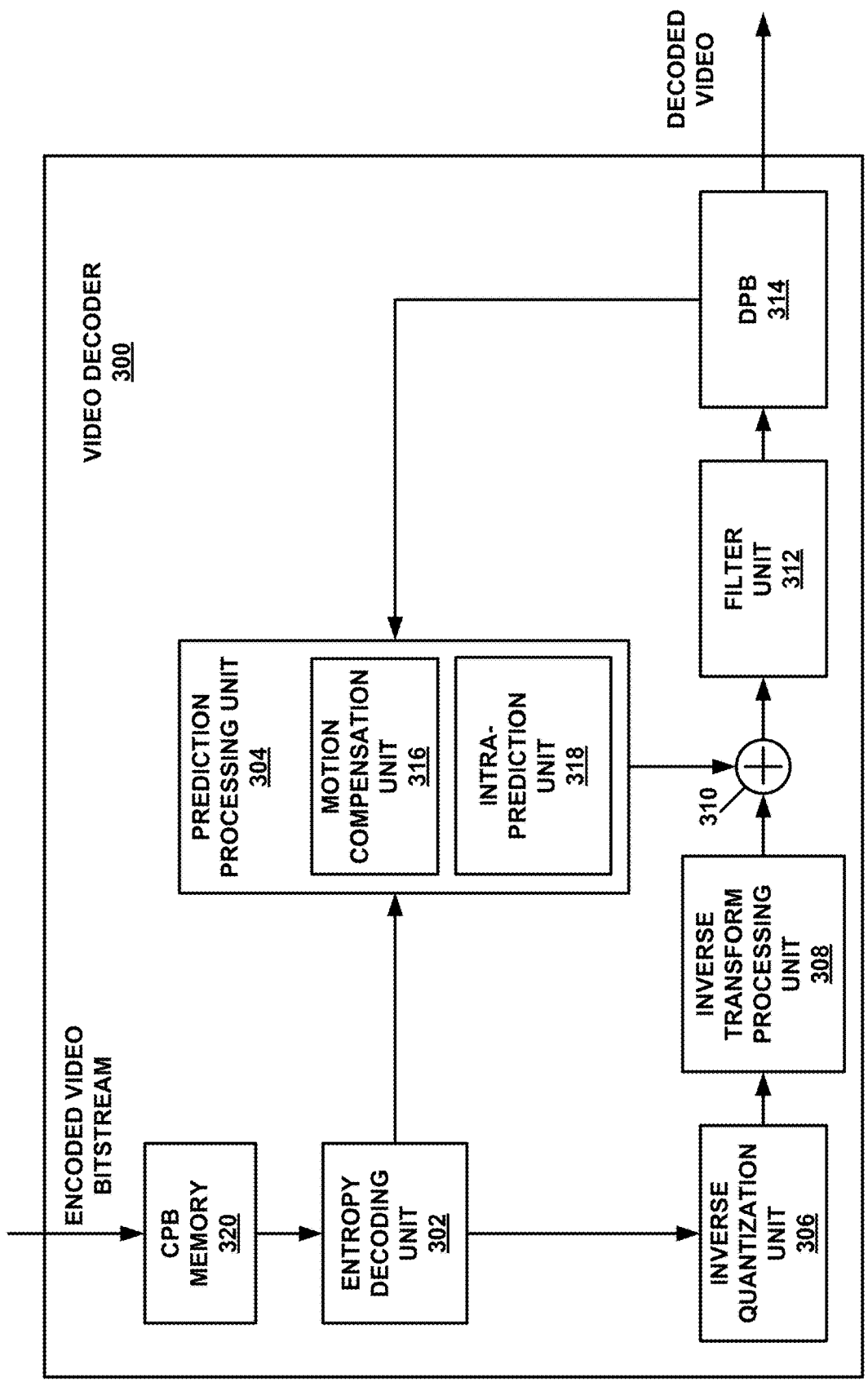
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra-prediction, non-directional intra-prediction, recursive filter intra-prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to construct a merge candidate list of merge candidates, wherein the merge candidate list has N1 candidates, N1 being a positive integer value, reorder the merge candidates in the merge candidate list to create a reordered merge candidate list, reduce the reordered merge candidate list to create an output merge candidate list, wherein the output merge candidate list has N2 candidates, wherein N2 is less than N1, and decode a block of video data using the output merge candidate list.

Figure 12:
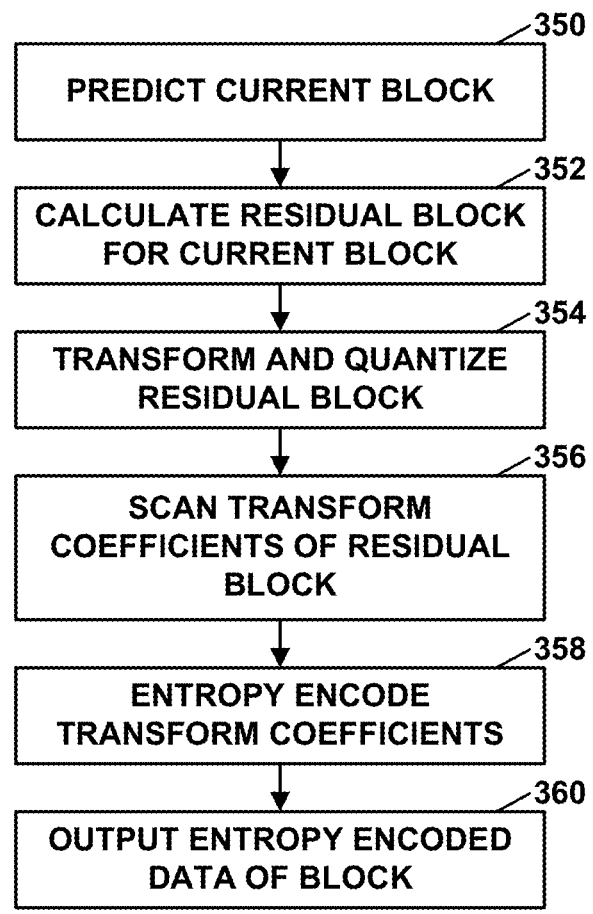
FIG. 12 is a flowchart illustrating an example method for encoding a current block in accordance with the techniques of this disclosure.

FIG. 12 is a flowchart illustrating an example method for encoding a current block in accordance with the techniques of this disclosure. The current block may comprise a current CU. Although described with respect to video encoder 200 (FIGS. 1 and 10), it should be understood that other devices may be configured to perform a method similar to that of FIG. 12.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 13:
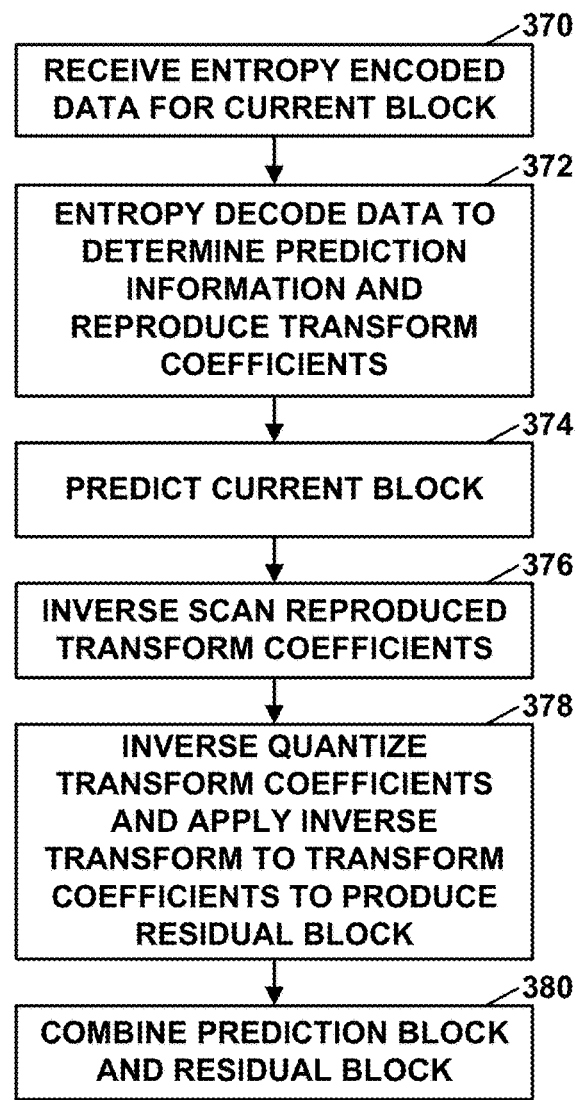
FIG. 13 is a flowchart illustrating an example method for decoding a current block in accordance with the techniques of this disclosure.

FIG. 13 is a flowchart illustrating an example method for decoding a current block of video data in accordance with the techniques of this disclosure. The current block may comprise a current CU. Although described with respect to video decoder 300 (FIGS. 1 and 11), it should be understood that other devices may be configured to perform a method similar to that of FIG. 13.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 14:
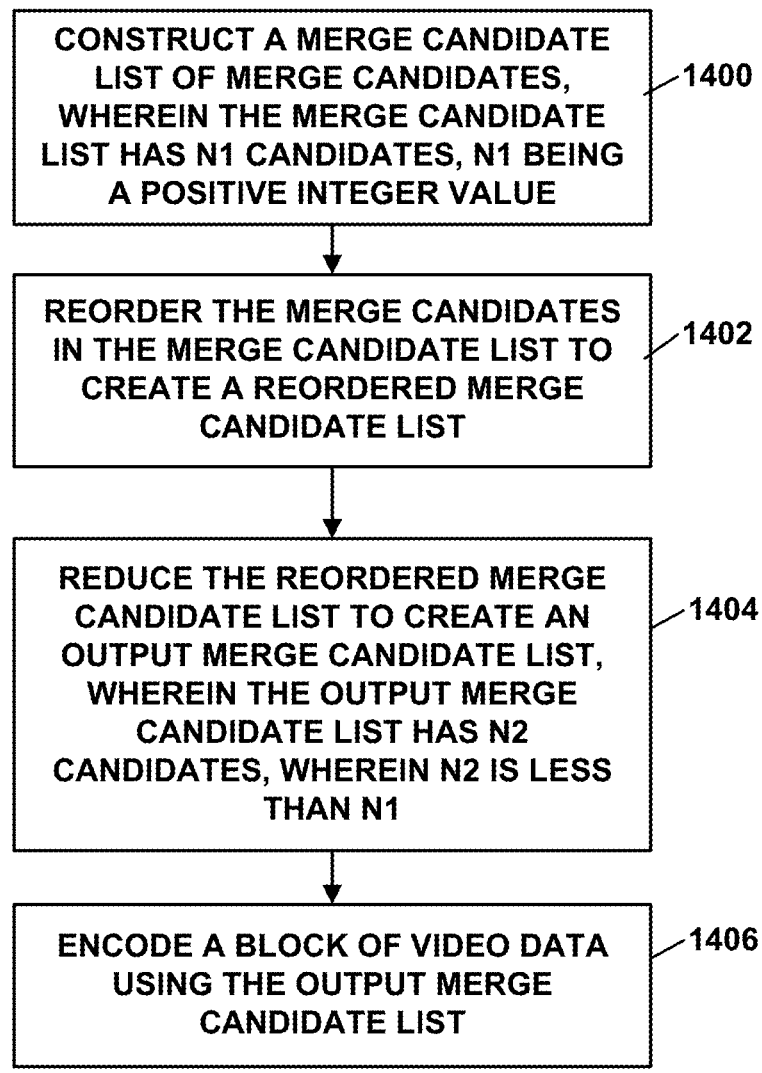
FIG. 14 is a flowchart illustrating another example method for encoding a current block in accordance with the techniques of this disclosure.

FIG. 14 is a flowchart illustrating another example method for encoding a current block in accordance with the techniques of this disclosure. The techniques of FIG. 14 may be performed by one or more structural components of video encoder 200, including motion estimation unit 222 and/or motion compensation unit 224.

In one example of the disclosure, video encoder 200 may be configured to construct a merge candidate list of merge candidates, wherein the merge candidate list has N1 candidates, N1 being a positive integer value (1400). Video encoder 200 may further be configured to reorder the merge candidates in the merge candidate list to create a reordered merge candidate list (1402), and reduce the reordered merge candidate list to create an output merge candidate list, wherein the output merge candidate list has N2 candidates, wherein N2 is less than N1 (1404). Video encoder 200 may then encode a block of video data using the output merge candidate list (1406).

In one example, to reorder the merge candidates in the merge candidate list to create the reordered merge candidate list, video encoder 200 may be configured to reorder the merge candidates in the merge candidate list using a template matching cost.

In another example, to reorder the merge candidates in the merge candidate list to create the reordered merge candidate list, video encoder 200 may be configured to reorder the merge candidates in the merge candidate list using a bilateral-matching cost.

In another example, to reorder the merge candidates in the merge candidate list to create the reordered merge candidate list, video encoder 200 may be configured to reorder the merge candidates in the merge candidate list using a bi-prediction cost.

In another example, video encoder 200 may be configured to encode a merge index into the output merge candidate list based on a value of N2.

In another example, to reduce the reordered merge candidate list, video encoder 200 is configured to discard the last N1-N2 candidates in the reordered merge candidate list.

In another example, video encoder 200 may be configured to encode a syntax element that indicates a first value of N1, and encode a syntax element that indicates a second value of N2. In another example, video encoder 200 may be configured to encode a syntax element that indicates a first value of N2, and encode a syntax element that indicates a second value of k, wherein k is larger than 0, and wherein N1 is equal to N2+k. In another example, video encoder 200 may be configured to encode a syntax element that indicates a first value of N2, and determine a second value for N1 as N2+k, wherein k is a fixed integer value greater than 0. In another example, video encoder 200 may be configured to determine a third value for k based on a merge mode.

Figure 15:
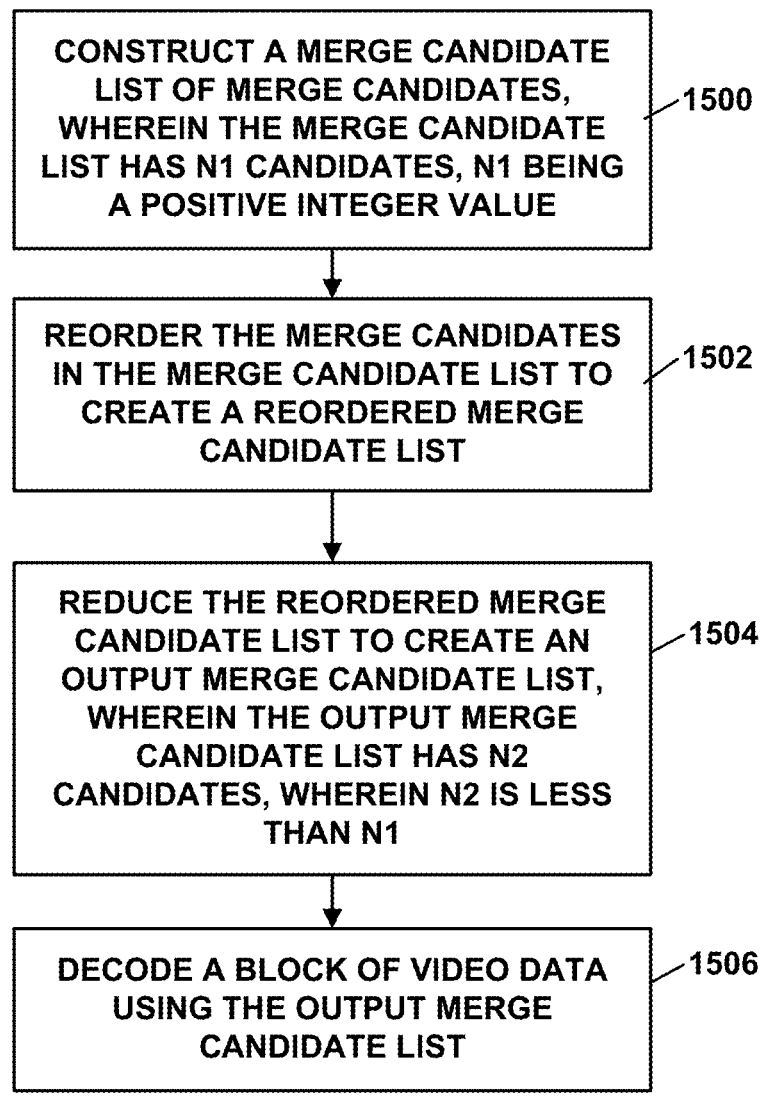
FIG. 15 is a flowchart illustrating another example method for decoding a current block in accordance with the techniques of this disclosure.

FIG. 15 is a flowchart illustrating another example method for decoding a current block in accordance with the techniques of this disclosure. The techniques of FIG. 15 may be performed by one or more structural components of video decoder 300, including motion compensation unit 316.

In one example of the disclosure, video decoder 300 may be configured to construct a merge candidate list of merge candidates, wherein the merge candidate list has N1 candidates, N1 being a positive integer value (1500). Video decoder 300 may further be configured to reorder the merge candidates in the merge candidate list to create a reordered merge candidate list (1502), and reduce the reordered merge candidate list to create an output merge candidate list, wherein the output merge candidate list has N2 candidates, wherein N2 is less than N1 (1504). Video decoder 300 may then decode a block of video data using the output merge candidate list (1506).

In one example, to reorder the merge candidates in the merge candidate list to create the reordered merge candidate list, video decoder 300 may be configured to reorder the merge candidates in the merge candidate list using a template matching cost.

In another example, to reorder the merge candidates in the merge candidate list to create the reordered merge candidate list, video decoder 300 may be configured to reorder the merge candidates in the merge candidate list using a bilateral-matching cost.

In another example, to reorder the merge candidates in the merge candidate list to create the reordered merge candidate list, video decoder 300 may be configured to reorder the merge candidates in the merge candidate list using a bi-prediction cost.

In another example, video decoder 300 may be configured to decode a merge index into the output merge candidate list based on a value of N2.

In another example, to reduce the reordered merge candidate list, video decoder 300 is configured to discard the last N1-N2 candidates in the reordered merge candidate list.

In another example, video decoder 300 may be configured to decode a syntax element that indicates a first value of N1, and decode a syntax element that indicates a second value of N2. In another example, video decoder 300 may be configured to decode a syntax element that indicates a first value of N2, and decode a syntax element that indicates a second value of k, wherein k is larger than 0, and wherein N1 is equal to N2+k. In another example, video decoder 300 may be configured to decode a syntax element that indicates a first value of N2, and determine a second value for N1 as N2+k, wherein k is a fixed integer value greater than 0. In another example, video decoder 300 may be configured to determine a third value for k based on a merge mode.

Other illustrative aspects of the disclosure are described below.

Aspect 1A—A method of coding video data, the method comprising: constructing a merge candidate list of merge candidates, wherein the merge candidate list has N1 candidates; reordering the merge candidates in the merge candidate list to create a reordered merge candidate list; pruning the reordered merge candidate list to create an output merge candidate list, wherein the output merge candidate list has N2 candidates, wherein N2 is less than N1; and coding a block of video data using the output merge candidate list.

Aspect 2A—The method of Aspect 1A, wherein reordering the merge candidates in the merge candidate list to create the reordered merge candidate list comprises: reordering the merge candidates in the merge candidate list using a template matching cost.

Aspect 3A—The method of Aspect 1A, wherein reordering the merge candidates in the merge candidate list to create the reordered merge candidate list comprises: reordering the merge candidates in the merge candidate list using a bilateral-matching cost.

Aspect 4A—The method of Aspect 1A, wherein reordering the merge candidates in the merge candidate list to create the reordered merge candidate list comprises: reordering the merge candidates in the merge candidate list using a bi-prediction cost.

Aspect 5A—The method of Aspect 1A, further comprising: coding a merge index into the output merge candidate list based on a value of N2.

Aspect 6A—The method of Aspect 1A, wherein pruning the reordered merge candidate list comprises: discarding the last N1-N2 candidates in the reordered merge candidate list.

Aspect 7A—The method of Aspect 1A, further comprising: coding a syntax element that indicates a first value of N1; and coding a syntax element that indicates a second value of N2.

Aspect 8A—The method of Aspect 1A, further comprising: coding a syntax element that indicates a first value of N2; and coding a syntax element that indicates a second value of k, wherein k is larger than 0, and wherein N1 is equal to N2+k.

Aspect 9A—The method of Aspect 1A, further comprising: coding a syntax element that indicates a first value of N2; and determining a second value for N1 as N2+k, wherein k is a fixed integer value greater than 0.

Aspect 10A—The method of Aspect 9A, further comprising: determining a third value for k based on a merge mode.

Aspect 11A—The method of Aspect 1A, wherein reordering the merge candidates in the merge candidate list to create the reordered merge candidate list comprises: reordering the merge candidates in the merge candidate list using a template matching cost.

Aspect 12A—The method of any of Aspects 1A-11A, wherein coding comprises decoding.

Aspect 13A—The method of any of Aspects 1A-11A, wherein coding comprises encoding.

Aspect 14A—A device for coding video data, the device comprising one or more means for performing the method of any of Aspects 1A-13A.

Aspect 15A—The device of Aspect 14A, wherein the one or more means comprise one or more processors implemented in circuitry.

Aspect 16A—The device of any of Aspects 14A and 15A, further comprising a memory to store the video data.

Aspect 17A—The device of any of Aspects 14A-16A, further comprising a display configured to display decoded video data.

Aspect 18A—The device of any of Aspects 14A-17A, wherein the device comprises one or more of a camera, a computer, a mobile device, a broadcast receiver device, or a set-top box.

Aspect 19A—The device of any of Aspects 14A-18A, wherein the device comprises a video decoder.

Aspect 20A—The device of any of Aspects 14A-19A, wherein the device comprises a video encoder.

Aspect 21A—A computer-readable storage medium having stored thereon instructions that, when executed, cause one or more processors to perform the method of any of Aspects 1A-13A.

Aspect 22A—A method of coding video data, the method comprising: constructing a merge candidate list of merge candidates, wherein the merge candidate list has N1 candidates; reordering the merge candidates in the merge candidate list to create a reordered merge candidate list; pruning the reordered merge candidate list to create an output merge candidate list, wherein the output merge candidate list has N2 candidates, wherein N2 is less than N1; and coding a block of video data using the output merge candidate list.

Aspect 23A—The method of Aspect 22A, wherein reordering the merge candidates in the merge candidate list to create the reordered merge candidate list comprises: reordering the merge candidates in the merge candidate list using a template matching cost.

Aspect 24A—The method of Aspect 22A, wherein reordering the merge candidates in the merge candidate list to create the reordered merge candidate list comprises: reordering the merge candidates in the merge candidate list using a bilateral-matching cost.

Aspect 25A—The method of Aspect 22A, wherein reordering the merge candidates in the merge candidate list to create the reordered merge candidate list comprises: reordering the merge candidates in the merge candidate list using a bi-prediction cost.

Aspect 26A—The method of any of Aspects 22A-25A, further comprising: coding a merge index into the output merge candidate list based on a value of N2.

Aspect 27A—The method of any of Aspects 22A-26A, wherein pruning the reordered merge candidate list comprises: discarding the last N1-N2 candidates in the reordered merge candidate list.

Aspect 28A—The method of any of Aspects 22A-27A, further comprising: coding a syntax element that indicates a first value of N1; and coding a syntax element that indicates a second value of N2.

Aspect 29A—The method of any of Aspects 22A-27A, further comprising: coding a syntax element that indicates a first value of N2; and coding a syntax element that indicates a second value of k, wherein k is larger than 0, and wherein N1 is equal to N2+k.

Aspect 30A—The method of any of Aspects 22A-27A, further comprising: coding a syntax element that indicates a first value of N2; and determining a second value for N1 as N2+k, wherein k is a fixed integer value greater than 0.

Aspect 31A—The method of Aspect 30A, further comprising: determining a third value for k based on a merge mode.

Aspect 32A—The method of any of Aspects 22A-31A, wherein reordering the merge candidates in the merge candidate list to create the reordered merge candidate list comprises: reordering the merge candidates in the merge candidate list using a template matching cost.

Aspect 33A—The method of any of Aspects 22A-32A, wherein coding comprises decoding.

Aspect 34A—The method of any of Aspects 22A-32A, wherein coding comprises encoding.

Aspect 35A—An apparatus configured to code video data, the apparatus comprising: a memory; and one or more processors implemented in circuitry and in communication with the memory, the one or more processors configured to perform any method of Aspects 22A-32A.

Aspect 1B—A method of coding video data, the method comprising: constructing a merge candidate list of merge candidates, wherein the merge candidate list has N1 candidates, N1 being a positive integer value; reordering the merge candidates in the merge candidate list to create a reordered merge candidate list; reducing the reordered merge candidate list to create an output merge candidate list, wherein the output merge candidate list has N2 candidates, wherein N2 is less than N1; and coding a block of video data using the output merge candidate list.

Aspect 2B—The method of Aspect 1B, wherein reordering the merge candidates in the merge candidate list to create the reordered merge candidate list comprises: reordering the merge candidates in the merge candidate list using a template matching cost.

Aspect 3B—The method of Aspect 1B, wherein reordering the merge candidates in the merge candidate list to create the reordered merge candidate list comprises: reordering the merge candidates in the merge candidate list using a bilateral-matching cost.

Aspect 4B—The method of Aspect 1B, wherein reordering the merge candidates in the merge candidate list to create the reordered merge candidate list comprises: reordering the merge candidates in the merge candidate list using a bi-prediction cost.

Aspect 5B—The method of Aspect 1B, further comprising: coding a merge index into the output merge candidate list based on a value of N2.

Aspect 6B—The method of Aspect 1B, wherein reducing the reordered merge candidate list comprises: discarding the last N1-N2 candidates in the reordered merge candidate list.

Aspect 7B—The method of Aspect 1B, further comprising: coding a syntax element that indicates a first value of N1; and coding a syntax element that indicates a second value of N2.

Aspect 8B—The method of Aspect 1B, further comprising: coding a syntax element that indicates a first value of N2; and coding a syntax element that indicates a second value of k, wherein k is larger than 0, and wherein N1 is equal to N2+k.

Aspect 9B—The method of Aspect 1B, further comprising: coding a syntax element that indicates a first value of N2; and determining a second value for N1 as N2+k, wherein k is a fixed integer value greater than 0.

Aspect 10B—The method of Aspect 9B, further comprising: determining a third value for k based on a merge mode.

Aspect 11B—The method of Aspect 1B, wherein coding comprises encoding.

Aspect 12B—The method of Aspect 1B, wherein coding comprises decoding.

Aspect 13B—An apparatus configured to code video data, the apparatus comprising: a memory configured to store video data; and one or more processors in communication with the memory, the one or more processors configured to: construct a merge candidate list of merge candidates, wherein the merge candidate list has N1 candidates, N1 being a positive integer value; reorder the merge candidates in the merge candidate list to create a reordered merge candidate list; reduce the reordered merge candidate list to create an output merge candidate list, wherein the output merge candidate list has N2 candidates, wherein N2 is less than N1; and code a block of video data using the output merge candidate list.

Aspect 14B—The apparatus of Aspect 13B, wherein to reorder the merge candidates in the merge candidate list to create the reordered merge candidate list, the one or more processors are further configured to: reorder the merge candidates in the merge candidate list using a template matching cost.

Aspect 15B—The apparatus of Aspect 13B, wherein to reorder the merge candidates in the merge candidate list to create the reordered merge candidate list, the one or more processors are further configured to: reorder the merge candidates in the merge candidate list using a bilateral-matching cost.

Aspect 16B—The apparatus of Aspect 13B, wherein to reorder the merge candidates in the merge candidate list to create the reordered merge candidate list, the one or more processors are further configured to: reorder the merge candidates in the merge candidate list using a bi-prediction cost.

Aspect 17B—The apparatus of Aspect 13B, wherein the one or more processors are further configured to: code a merge index into the output merge candidate list based on a value of N2.

Aspect 18B—The apparatus of Aspect 13B, wherein to reduce the reordered merge candidate list, the one or more processors are further configured to: discard the last N1-N2 candidates in the reordered merge candidate list.

Aspect 19B—The apparatus of Aspect 13B, wherein the one or more processors are further configured to: code a syntax element that indicates a first value of N1; and code a syntax element that indicates a second value of N2.

Aspect 20B—The apparatus of Aspect 13B, wherein the one or more processors are further configured to: code a syntax element that indicates a first value of N2; and code a syntax element that indicates a second value of k, wherein k is larger than 0, and wherein N1 is equal to N2+k.

Aspect 21B—The apparatus of Aspect 13B, wherein the one or more processors are further configured to: code a syntax element that indicates a first value of N2; and determine a second value for N1 as N2+k, wherein k is a fixed integer value greater than 0.

Aspect 22B—The apparatus of Aspect 21B, wherein the one or more processors are further configured to: determine a third value for k based on a merge mode.

Aspect 23B—The apparatus of Aspect 14B, wherein the apparatus is configured to encode video data.

Aspect 24B—The apparatus of Aspect 14B, wherein the apparatus is configured to decode video data.

Aspect 25B—An apparatus configured to code video data, the apparatus comprising: means for constructing a merge candidate list of merge candidates, wherein the merge candidate list has N1 candidates, N1 being a positive integer value; means for reordering the merge candidates in the merge candidate list to create a reordered merge candidate list; means for reducing the reordered merge candidate list to create an output merge candidate list, wherein the output merge candidate list has N2 candidates, wherein N2 is less than N1; and means for coding a block of video data using the output merge candidate list.

Aspect 26B—A non-transitory computer-readable storage medium storing instructions that, when executed, cause one or more processors of a device configured to code video data to: construct a merge candidate list of merge candidates, wherein the merge candidate list has N1 candidates, N1 being a positive integer value; reorder the merge candidates in the merge candidate list to create a reordered merge candidate list; reduce the reordered merge candidate list to create an output merge candidate list, wherein the output merge candidate list has N2 candidates, wherein N2 is less than N1; and code a block of video data using the output merge candidate list.

Aspect 1C—A method of coding video data, the method comprising: constructing a merge candidate list of merge candidates, wherein the merge candidate list has N1 candidates, N1 being a positive integer value; reordering the merge candidates in the merge candidate list to create a reordered merge candidate list; reducing the reordered merge candidate list to create an output merge candidate list, wherein the output merge candidate list has N2 candidates, wherein N2 is less than N1; and coding a block of video data using the output merge candidate list.

Aspect 2C—The method of Aspect 1C, wherein reordering the merge candidates in the merge candidate list to create the reordered merge candidate list comprises: reordering the merge candidates in the merge candidate list using a template matching cost.

Aspect 3C—The method of Aspect 1C, wherein reordering the merge candidates in the merge candidate list to create the reordered merge candidate list comprises: reordering the merge candidates in the merge candidate list using a bilateral-matching cost.

Aspect 4C—The method of Aspect 1C, wherein reordering the merge candidates in the merge candidate list to create the reordered merge candidate list comprises: reordering the merge candidates in the merge candidate list using a bi-prediction cost.

Aspect 5C—The method of any of Aspects 1C-4C, further comprising: coding a merge index into the output merge candidate list based on a value of N2.

Aspect 6C—The method of any of Aspects 1C-5C, wherein reducing the reordered merge candidate list comprises: discarding the last N1-N2 candidates in the reordered merge candidate list.

Aspect 7C—The method of any of Aspects 1C-6C, further comprising: coding a syntax element that indicates a first value of N1; and coding a syntax element that indicates a second value of N2.

Aspect 8C—The method of any of Aspects 1C-6C, further comprising: coding a syntax element that indicates a first value of N2; and coding a syntax element that indicates a second value of k, wherein k is larger than 0, and wherein N1 is equal to N2+k.

Aspect 9C—The method of any of Aspects 1C-6C, further comprising: coding a syntax element that indicates a first value of N2; and determining a second value for N1 as N2+k, wherein k is a fixed integer value greater than 0.

Aspect 10C—The method of Aspect 9C, further comprising: determining a third value for k based on a merge mode.

Aspect 11C—The method of any of Aspects 1C-10C, wherein coding comprises encoding.

Aspect 12C—The method of any of Aspects 1C-10C, wherein coding comprises decoding.

Aspect 13C—An apparatus configured to code video data, the apparatus comprising: a memory configured to store video data; and one or more processors in communication with the memory, the one or more processors configured to: construct a merge candidate list of merge candidates, wherein the merge candidate list has N1 candidates, N1 being a positive integer value; reorder the merge candidates in the merge candidate list to create a reordered merge candidate list; reduce the reordered merge candidate list to create an output merge candidate list, wherein the output merge candidate list has N2 candidates, wherein N2 is less than N1; and code a block of video data using the output merge candidate list.

Aspect 14C—The apparatus of Aspect 13C, wherein to reorder the merge candidates in the merge candidate list to create the reordered merge candidate list, the one or more processors are further configured to: reorder the merge candidates in the merge candidate list using a template matching cost.

Aspect 15C—The apparatus of Aspect 13C, wherein to reorder the merge candidates in the merge candidate list to create the reordered merge candidate list, the one or more processors are further configured to: reorder the merge candidates in the merge candidate list using a bilateral-matching cost.

Aspect 16C—The apparatus of Aspect 13C, wherein to reorder the merge candidates in the merge candidate list to create the reordered merge candidate list, the one or more processors are further configured to: reorder the merge candidates in the merge candidate list using a bi-prediction cost.

Aspect 17C—The apparatus of any of Aspects 13C-16C, wherein the one or more processors are further configured to: code a merge index into the output merge candidate list based on a value of N2.

Aspect 18C—The apparatus of any of Aspects 13C-17C, wherein to reduce the reordered merge candidate list, the one or more processors are further configured to: discard the last N1-N2 candidates in the reordered merge candidate list.

Aspect 19C—The apparatus of any of Aspects 13C-18C, wherein the one or more processors are further configured to: code a syntax element that indicates a first value of N1; and code a syntax element that indicates a second value of N2.

Aspect 20C—The apparatus of any of Aspects 13C-18C, wherein the one or more processors are further configured to: code a syntax element that indicates a first value of N2; and code a syntax element that indicates a second value of k, wherein k is larger than 0, and wherein N1 is equal to N2+k.

Aspect 21C—The apparatus of any of Aspects 13C-18C, wherein the one or more processors are further configured to: code a syntax element that indicates a first value of N2; and determine a second value for N1 as N2+k, wherein k is a fixed integer value greater than 0.

Aspect 22C—The apparatus of Aspect 22C, wherein the one or more processors are further configured to: determine a third value for k based on a merge mode.

Aspect 23C—The apparatus of any of Aspects 13C-22C, wherein the apparatus is configured to encode video data.

Aspect 24C—The apparatus of any of Aspects 13C-22C, wherein the apparatus is configured to decode video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
coding one or more syntax elements indicative of a first value of N1 and a second value of N2, wherein N1 is a positive integer value, and wherein N2 is less than N1, wherein coding the one or more syntax elements indicative of the first value of N1 and the second value of N2 comprises:
coding a first syntax element that indicates the second value of N2; and
determining the second value for N1 as N2+k, wherein k is a fixed integer value greater than 0;
constructing a merge candidate list of merge candidates, wherein the merge candidate list has N1 candidates;

reordering the N1 merge candidates in the merge candidate list according to a cost function to create a reordered merge candidate list;

discarding a last N1-N2 candidates in the reordered merge candidate list to reduce the reordered merge candidate list to a specified number, N2, of candidates to create an output merge candidate list, wherein the output merge candidate list has N2 candidates, and wherein the N2 candidates in the output merge candidate list have smaller costs of the cost function relative to the N1-N2 candidates that were discarded; and coding a block of video data using the output merge candidate list.

2. The method of claim 1, wherein reordering the merge candidates in the merge candidate list according to the cost function to create the reordered merge candidate list comprises:

reordering the merge candidates in the merge candidate list using a template matching cost.

3. The method of claim 1, wherein reordering the merge candidates in the merge candidate list according to the cost function to create the reordered merge candidate list comprises:

reordering the merge candidates in the merge candidate list using a bilateral-matching cost.

4. The method of claim 1, wherein reordering the merge candidates in the merge candidate list according to the cost function to create the reordered merge candidate list comprises:

reordering the merge candidates in the merge candidate list using a bi-prediction cost.

5. The method of claim 1, further comprising:

coding a merge index into the output merge candidate list based on a value of N2.

6. The method of claim 1, further comprising:

determining a third value for k based on a merge mode.

7. The method of claim 1, wherein coding comprises encoding.

8. The method of claim 1, wherein coding comprises decoding.

9. An apparatus configured to code video data, the apparatus comprising:

a memory configured to store video data; and one or more processors in communication with the memory, the one or more processors configured to:

code one or more syntax elements indicative of a first value of N1 and a second value of N2, wherein N1 is a positive integer value, and wherein N2 is less than N1, wherein to code the one or more syntax elements indicative of the first value of N1 and the second value of N2, the one or more processors are further configured to:

code a first syntax element that indicates the second value of N2; and determine the second value for N1 as N2+k, wherein k is a fixed integer value greater than 0;

construct a merge candidate list of merge candidates, wherein the merge candidate list has N1 candidates;

reorder the NI merge candidates in the merge candidate list according to a cost function to create a reordered merge candidate list;

discard a last N1-N2 candidates in the reordered merge candidate list to reduce the reordered merge candidate list to a specified number, N2, of candidates to create an output merge candidate list, wherein the output merge candidate list has N2 candidates, and wherein the N2 candidates in the output merge candidate list have smaller costs of the cost function relative to the N1-N2 candidates that were discarded; and code a block of video data using the output merge candidate list.

10. The apparatus of claim 9, wherein to reorder the merge candidates in the merge candidate list according to the cost function to create the reordered merge candidate list, the one or more processors are further configured to:

reorder the merge candidates in the merge candidate list using a template matching cost.

11. The apparatus of claim 9, wherein to reorder the merge candidates in the merge candidate list according to the cost function to create the reordered merge candidate list, the one or more processors are further configured to:

reorder the merge candidates in the merge candidate list using a bilateral-matching cost.

12. The apparatus of claim 9, wherein to reorder the merge candidates in the merge candidate list according to the cost function to create the reordered merge candidate list, the one or more processors are further configured to:

reorder the merge candidates in the merge candidate list using a bi-prediction cost.

13. The apparatus of claim 9, wherein the one or more processors are further configured to:

code a merge index into the output merge candidate list based on a value of N2.

14. The apparatus of claim 9, wherein the one or more processors are further configured to:

determine a third value for k based on a merge mode.

15. The apparatus of claim 9, wherein the apparatus is configured to encode video data.

16. The apparatus of claim 9, wherein the apparatus is configured to decode video data.

17. An apparatus configured to code video data, the apparatus comprising:

means for coding one or more syntax elements indicative of a first value of N1 and a second value of N2, wherein N1 is a positive integer value, and wherein N2 is less than N1, wherein means for coding the one or more syntax elements indicative of the first value of N1 and the second value of N2 comprises:

means for coding a first syntax element that indicates the second value of N2; and means for determining the second value for N1 as N2+k, wherein k is a fixed integer value greater than 0;

means for constructing a merge candidate list of merge candidates, wherein the merge candidate list has N1 candidates;

means for reordering the N1 merge candidates in the merge candidate list according to a cost function to create a reordered merge candidate list;

means for discarding a last N1-N2 candidates in the reordered merge candidate list to reduce the reordered merge candidate list to a specified number, N2, of candidates to create an output merge candidate list, wherein the output merge candidate list has N2 candidates, and wherein the N2 candidates in the output merge candidate list have smaller costs of the cost function relative to the N1-N2 candidates that were discarded; and means for coding a block of video data using the output merge candidate list.

* * * * *